United States Patent [19]
Acker et al.

[11] Patent Number: 6,141,792
[45] Date of Patent: Oct. 31, 2000

[54] OBJECT ORIENTED FRAMEWORK FOR SPECIFYING THE FORMAT OF COMPILER OUTPUT WITH A TEMPLATE FACILITY

[75] Inventors: Liane Elizabeth Acker, Round Rock; Michael Haden Conner; Andrew Richard Martin, both of Austin, all of Tex.

[73] Assignee: International Business Machines Corporation, Armonk, N.Y.

[21] Appl. No.: 08/919,022

[22] Filed: Aug. 27, 1997

Related U.S. Application Data

[63] Continuation of application No. 08/332,618, Oct. 31, 1994, Pat. No. 5,715,460.

[51] Int. Cl.[7] .................................................. G06F 9/44
[52] U.S. Cl. .................................................. 717/5; 717/7
[58] Field of Search .................................. 395/701, 702, 395/705, 707, 708, 706, 712; 717/5, 7

[56] References Cited

U.S. PATENT DOCUMENTS

| | | | |
|---|---|---|---|
| 5,428,792 | 6/1995 | Conner et al. | 395/708 |
| 5,493,680 | 2/1996 | Danforth | 395/702 |

OTHER PUBLICATIONS

Bjarne Stoustrup "The Design and Evolution of C ++" Chapters 0,1 and 15 (Templates), Mar. 9, 1994.
Principles of Compiler Design Aho et al.Chapter 1, Apr. 1979.
IBM SOMobjects Development Toolkit Users Guide Version 2.0, Jun. 1993.
Compilers Principles, Techniques and Tools Aho et al. Chapters 1–5,7–9,11 and 12, Sep. 1985.

*Primary Examiner*—Tariq R. Hafiz
*Assistant Examiner*—Todd Ingberg
*Attorney, Agent, or Firm*—Jeffrey S. LaBaw

[57] ABSTRACT

The format of an output file from a compiler is altered using two new objects, a template definition file for specifying the desired formats for the sections of the output file and a template facility for formatting output from the compiler according to the template definition file. The desired formats are specified by patterned sets of symbol names in the template definition file. A symbol table which is maintained by the template facility stores a set of symbol values corresponding to the symbol names. The template facility outputs the section by placing symbol values from the symbol table in the output file according to the positions of the corresponding symbol names in the patterned sets of symbol names.

12 Claims, 12 Drawing Sheets

STRUCTURE OF THE SOM COMPILER

STRUCTURE OF THE SOM EMITTER FRAMEWORK

OBJECT ORIENTED FRAMEWORK FOR SPECIFYING THE FORMAT OF COMPILER OUTPUT WITH A TEMPLATE FACILITY

This application is a continuation of Ser. No. 08/332,618 filed Oct. 31, 1994 now U.S. Pat. No. 5,715,460.

This invention is related to commonly assigned patent application Ser. Nos. 08/077,350 and 08/077,351 respectively filed Jun. 14, 1993.

BACKGROUND OF THE INVENTION

The present invention relates generally to data processing systems. More particularly, it relates to systems to produce a plurality of different output files for programs.

The development of programming for data processing systems has traditionally been a time consuming task. Object oriented programming (OOP) has emerged as a promising new technology which will allow more efficient development reuse and customization of new software programming. Object oriented programming shifts the emphasis of software development away from function decomposition and towards the recognition of units of software called "objects" which both encapsulate data and function. As a result, programs become easier to maintain and enhance.

Yet despite its promise, object oriented technology has not penetrated major commercial software products to date. This is due in part because of the obstacles which the developer must confront when utilizing object oriented programming. A first obstacle that developers must confront is the choice of which object oriented programming language to use. The early expressions of object oriented programming concept focused on the creation of tool kits and languages, each of which are designed to exploit some particular aspect of OOP. So called, pure object oriented languages such as SmallTalk use a run time environment which will operate smoothly and consistently so long as the developer works within the supplied environment. However, when interacting with foreign environments, the objects must be reduced to data structures which do not retain the advantages which objects offer with regard to encapsulation and code use. Hybrid languages, such as C++ require less run time support, but can result in tight bindings between the programs which provide the objects and the clients which use them. Tight binding implies that the client programs must be recompiled whenever simple changes are made to the library. The second obstacle is the disparity in concept among the plurality of different object oriented languages; tool kits embrace different incompatible models of what objects are and how they work. The software developed using any particular language or tool kit is limited in scope. A program implemented in one language can rarely be used in another.

The System Object Module "SOM" is a new object oriented technology for building packaging and manipulating object oriented programs designed to unite various object oriented approaches. In SOM, the interfaces of the classes of objects, together with the names of the method they support, the return types, the parameter types and so forth, are specified in a standard language called the Interface Definition Language (IDL). The actual implementation of the object class can be performed in whatever programming language the developer prefers. The preferred programming language need not necessarily be an object oriented programming language, but might be a procedural language such as C. Thus, the advantages of object oriented programming can be extended to programmers non object oriented programming languages. SOM is described in greater detail in the OS2.20 SOM Guide and Reference a publication of the IBM Corporation, which is hereby incorporated by reference.

The SOM compiler translates the IDL interface specification into a variety of different output forms. The interface definition can be translated into a programming language binding file an implementation template file, a documentation file, a description that can drive a class browser or a printed interface specification. The structure of the SOM compiler is divided into an IDL parser which understands the interface definition in IDL and translates in an abstract syntax graph an intermediate language. It also includes an emitter which translates intermediate language to the desired output form. A plurality of different output forms are supported by having interchangeable emitters, however, to date each emitter must be programmed by hand, which is a laborious and time consuming effort.

The present invention makes it easier to develop new emitters for inclusion in the SOM compiler.

SUMMARY OF THE INVENTION

It is, therefore, an object of the present invention to provide a framework which insulates the programmer from changes to the interface definition language.

It is another object of the invention to improve the ease of development and maintenance of emitters.

It is another object of the invention to specify the form of the output file produced by a compiler.

It is another object of the invention to divide the control language of the compiler into small, easily maintained and reusable components.

These and other object features and advantages of the present invention are accomplished by altering the format of an output file from a compiler using two new objects, a template definition file for specifying the desired formats for the sections of the output file and a template facility for formatting output from the compiler according to the template definition file. The desired formats are specified by patterned sets of symbol names in the template definition file. A symbol table which is maintained by template facility stores a set of symbol values corresponding to the symbol names. The template facility outputs the section by placing symbol values from the symbol table in the output file according to the positions of the corresponding symbol names in the patterned sets of symbol names.

Each section of the template file, and therefore the output file, corresponds to an element in an interface definition file which is input to the compiler. In the preferred embodiment, the compiler is divided into a parser which translates the interface definition file into an intermediate form and an emitter which translates the intermediate form into the output file. The emitter controls which of the section of the template definition file are output and in what order. In addition to simple substitution of symbol values for symbol names, the symbol values can be placed in a comment form or a list form.

BRIEF DESCRIPTION OF THE DRAWINGS

These and other features, advantages and objects will be more easily understood with references to the following description and attached drawings.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2 Model* 50, 60 systems IBM Corporation, Part No. 68X2224 Order No. S68X-2224 and *Technical Reference Manual Personal Systems/2 (Model* 80) IBM Corporation Part No. 68X2256 Order No. S68X-2254. One operating system which an IBM PS/2 personal computer may run is IBM's OS/2 2.0 (TM). For more information on the IBM OS/2 2.0 Operating System, the reader is referred to *OS/2 2.0 Technical Library, Programming Guide*, Vols. 1, 2, 3 Version 2.00 Order No. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical Reference*, Order No. SA23-2644-00. The AIX operating system is described in *General Concepts and Procedures—AIX Version 3 for RISC System/6000*, Order No. SC23-2202-00, as well as other publications of the IBM Corporation.

Figure 1:
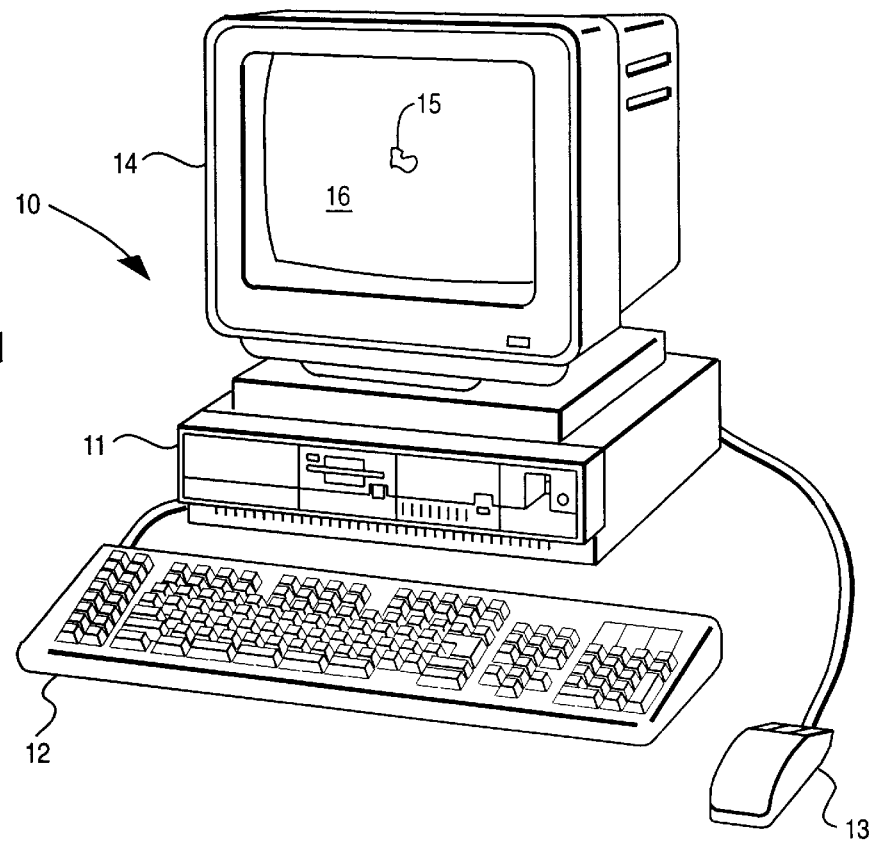
FIG. 1 depicts a computer system including system display, system unit, mouse and keyboard.

In FIG. 1, a computer 10, comprising a system unit 11, a keyboard 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the mouse buttons to perform a user command or selection.

Figure 2:
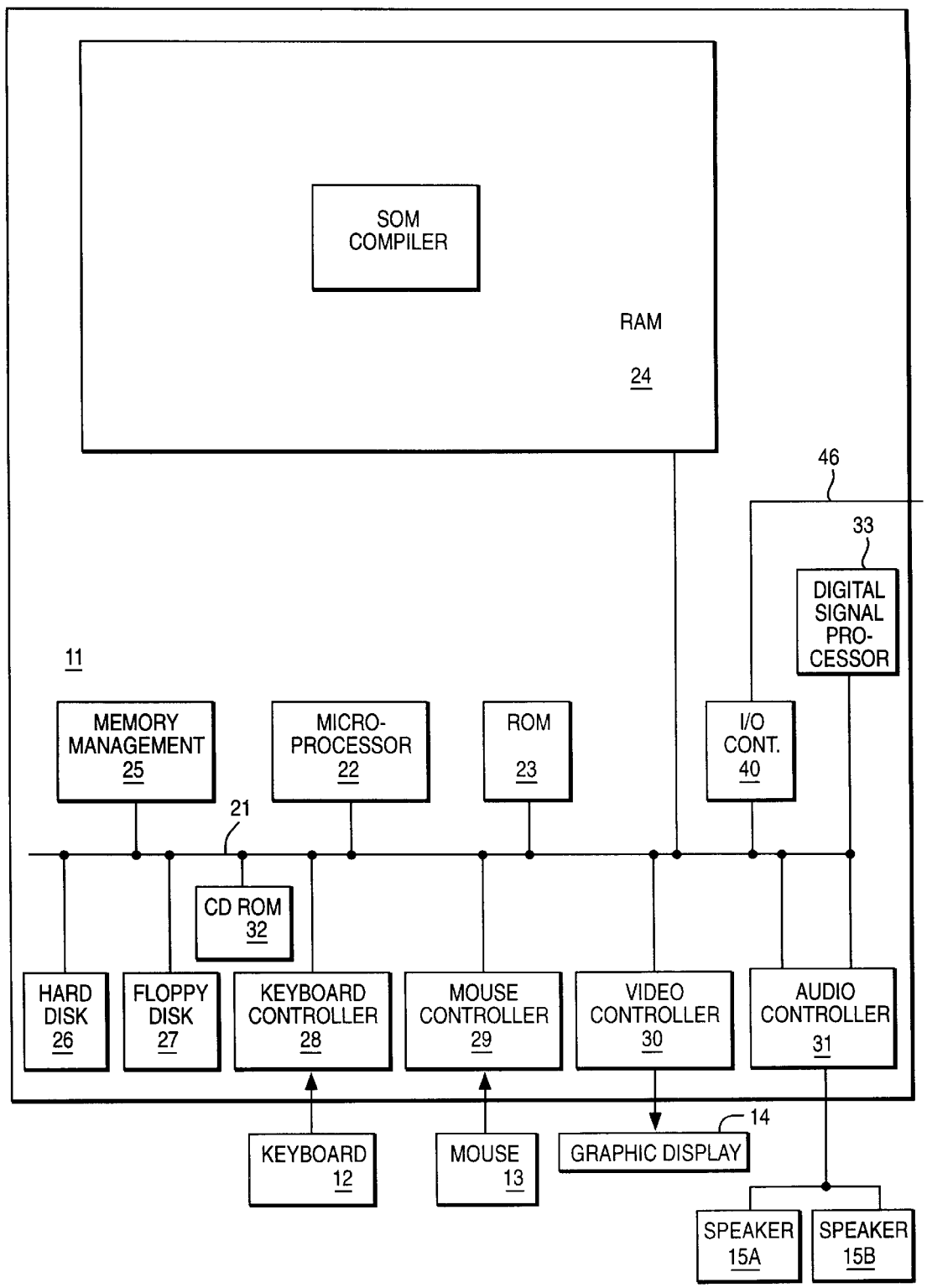
FIG. 2 is an architectural block diagram of the computer system in FIG. 1

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors included, but not limited to, Motorola's family of microprocessors such as the 68000, 68020 or the 68030 microprocessors and various Reduced Instruction Set computer (RISC) microprocessors manufactured by IBM, Hewlett Packard, Sun, Intel, Motorola and others may be used in the specific computer.

The ROM 23 contains among other code and Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drives 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as several sets of instructions in a code module resident in the random access memory 24. Until required by the computer system, the sets of instructions may be stored in another computer memory, for example, in the hard disk drive 26, or in a removable memory such as an optical disk for eventual use in the CD ROM 32 or a floppy disk for eventual use in the floppy disk drive 27.

SOM is described in greater detail in copending and commonly assigned application Ser. No. 07/805,668 "Language Neutral Objects" filed May 4, 1992, to M. Conner et al, which is hereby incorporated by reference. SOM will be discussed in the present application only insofar as necessary to understand the present invention. Nonetheless, several facets of SOM are worth mentioning. Within SOM and other object oriented systems, each object has certain data attributes and methods which operate on the data. Data is said to be "encapsulated" by an object and can only be modified by the method which belongs to the object. Methods are typically invoked by sending a message to an object, identifying the desired method and supplying any needed arguments. Class Objects can be subclassed to create new class objects. "Inheritance" is the ability to derive a new object from an existing object inheriting all properties such as methods and data structure from the existing object. The new object may have certain unique features such as new methods which are added to or override existing methods of the existing class. A new subclass needs only specify the functions and data which distinguish it from its already existing base class. Thus, the software developer does not need to develop an entirely new piece of code. He or she need only specify the new unique features of the software.

Figure 3:
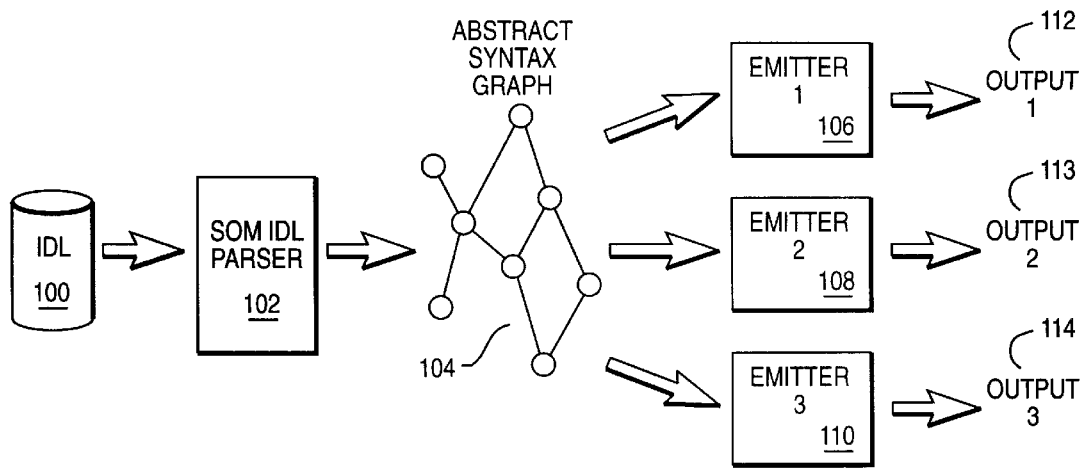
FIG. 3 is an illustration of the structure of a SOM compiler.

The SOM compiler helps developers build classes in which the interface and implementation are decoupled. The SOM compiler reads the IDL definition of a class interface and generates several different output files. As shown in FIG. 3, the SOM compiler takes an interface 100 for a class of objects written in one language, IDL, and translates the IDL interface description 100 into a variety of different output forms. The syntax and semantics of the Interface Definition Language (IDL) are described in Chapter Four of *The Common Object Request Broker: Architecture and Specification* published by the Object Management Group and X/Open which is hereby incorporated by reference. Those skilled in the art would recognize that other languages could be utilized to specify the interface. The interface 100 is parsed by the SOM IDL parser 102 into an abstract syntax graph 104, an intermediate data structure. In one preferred embodiment, each node of the abstract syntax graph 104 is a struct, a well known data structure in the C programming language, which represents a syntactic unit of the interface definition. The abstract syntax graph 104 can be sent to a number of different emitters 106, 108, 110 which produce a variety of different output forms 112, 113, 114. For example, the output forms can be a programming language binding file, an implementation template file, a documentation file, a description that can drive a class browser, a printed interface description, etc. Given the number of programming languages with which SOM can be used and the number of programming tools which can utilize object definitions, it is essential that a large number of output forms be produced. Therefore, it is important that the effort in developing and maintaining the emitter portions of the SOM compiler be minimized. As can be seen in the figure, for each output file the only part of the SOM compiler that varies is the emitter or the back end.

To make it easier to develop new emitters for use with the SOM compiler, the emitter framework has been developed.

Figure 4:
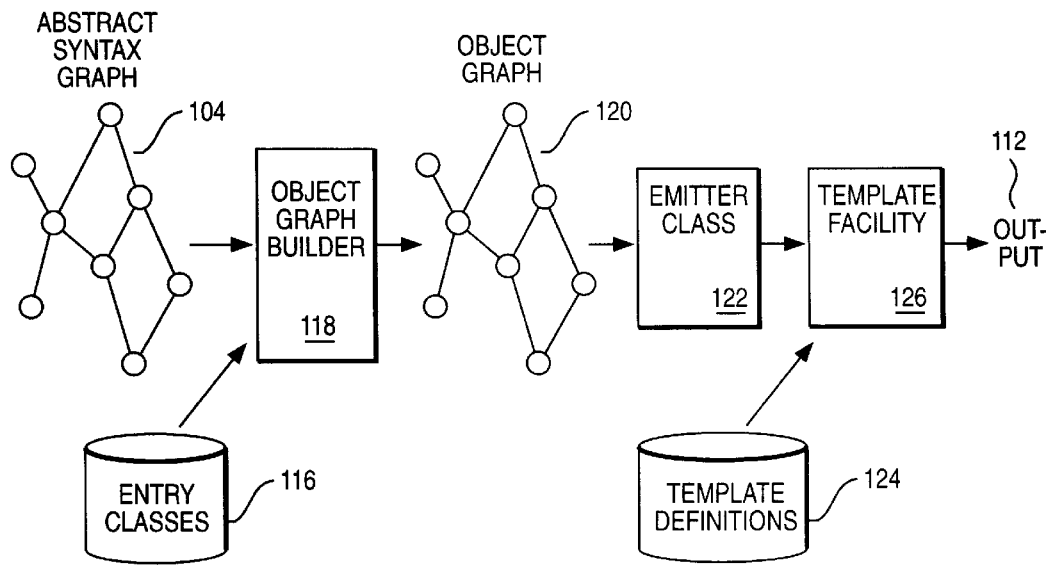
FIG. 4 is an illustration an of the structure of an Emitter Framework.

The emitter framework consists of several support classes, the Entry classes: SOMTEntryC, SOMTClassEntryC, SOMTMethodEntryC, etc., and a general emitter class, SOMTEmitC, that can be subclassed to produce a new emitter for the SOM compiler. As shown in FIG. 4, the input to the emitter framework is the abstract syntax graph 104, which is output by the SOM IDL parser 102 in FIG. 3. Each node of the abstract syntax graph represents a syntactic unit of the interface definition. Once the abstract syntax graph 104 has been constructed, it is fed to the object graph builder 118, which traverses the abstract syntax graph 104 to build a second intermediate data structure, an isomorphic graph of entry objects 120. When the object graph builder 118 encounters a new entry structure from the abstract syntax graph 104, the emitter framework "wraps" the entry with an object instantiated from one of the emitter framework's entry classes, e.g., SOMTCLASSEntryC, SOMTMethodEntryC, SOMTDataEntryC, . . . , 116. It is an important facet of the emitter framework that it does not actually produce a full object graph unless it is needed. Rather, it generates only those portions of the entry object graph that are used by particular emitter, as they are required. As many emitters use only a small portion of the object graph, this produces a significant space and time savings.

Both the SOM IDL parser 102 in FIG. 3 and the object graph builder 118 in FIG. 4 are preferably closed parts of the SOM compiler; they cannot be extended or modified by programmers. However, the initial interface definition which is fed into the parser provides for an open ended of set of modifiers which can be associated with most syntactic elements. These modifiers, when specified in an IDL file, are accessible to emitters written using the emitter framework. Further, before the object graph builder is run, an emitter can cause some or all the emitter framework classes (SOMTEntryC, SOMTClassEntryC, SOMTMethodEntryC, etc.) to be shadowed, effectively replacing them by user defined subclasses. When the programmer shadows a particular entry class, the object graph builder uses instances of the programmer's subclass of that entry class rather than the instances of the original entry class. Thus, the programmer can modify the object graph even though the object graph builder creates all the entry class instances in code which is not open to the programmer.

The emitter class, SOMTEmitC, 122 is the class that drives the process of producing an output file. The template facility 126 is used by the emitter 122 to produce output. The template class, SOMTTemplateOutputC, 126 recognizes template definitions 124 of the output so that information about how the output file 112 should look can be placed in a template definition 124 and does not need to be embedded in the emitter code. The template definitions 124 describe the content and format of every section of the output file. The emitter controls which of these sections are output and in what order.

The code modules described in connection with FIG. 4 are described in greater detail below.

Abstract Syntax Graph

The input to the Emitter Framework is an abstract syntax graph of data structures. The abstract syntax graph is produced by the SOM IDL parser. The SOM Compiler's IDL parser reads the input .idl file and converts the interface descriptions that are included in it (either directly or indirectly) into the abstract syntax graph. Each node of the abstract syntax graph is a struct which represents a syntactic unit of the interface definition, e.g., a method declaration, a parameter, an attribute declaration.

Given the following IDL specification as input:

```
interface MyClass : SOMObject {
    void myMethod (in short x);
};
``` the SOM Compiler would produce, as the "center" of the abstract syntax graph, a struct for the MyClass definition. This struct would have members describing the class's name (MyClass), the .idl file in which it was defined, the number of methods it introduces, in this case one, any comment associated with the class, in this case, none, the line number within the source file at which the definition appears, the class's parent class(es) (SOMObject), the number of methods the class inherits (from SOMObject), etc. The struct also includes a member that is a linked list of structs, one for each method the class introduces. In this example, the list would contain one struct for the new method myMethod. This struct would include members that give the method name (myMethod), its return type (void), its comment (none), the line number within the source file at which the definition appears. The struct also includes whether the method accepts a variable number of arguments, for this example, no, whether the method is "one way", for this example, no, the number of arguments (one), any context string literals for the method, none for this example, etc. The struct for the method "myMethod" also includes a linked list of structs representing (1) any exceptions the method raises, and (2) each parameter of the method. In this example, there would be one struct representing the parameter x of myMethod. The struct for parameter x, in turn, could include pointers to struct representing other syntactic units of the IDL specification, such as type definitions. Hence, the struct representing the MyClass definition points to other structs, which points to other structs, and so on, resulting in a graph of structures that fully represent the contents of the IDL specification, the abstract syntax graph. This graph then becomes the input to an emitter written using the emitter framework.

The entry classes

The entry classes e.g., SOMTEntryC, SOMTClassEntryC, are used by the object graph builder to construct the object graph. Each node of the object graph is an instance of one of the entry classes. Each instance of an entry class represents one syntactic unit of an IDL interface definition—that is, one piece or one "entry" from the complete IDL interface definition. In the same way, each node of the abstract syntax graph represents one syntactic unit of the IDL definition.

An entry object serves two important functions:

1. Holding information about the corresponding syntactic element of an IDL specification.

2. Defining symbols that can be used as placeholders in an emitter's output template.

The purpose of the entry classes is to hide the syntax of the .idl file and to hide the actual data structures produced by the SOM Compiler. They return information about an IDL interface definition in a way that is neutral to the source syntax of the IDL definition and to the nature of the emitter in which the information will be used.

The entry classes are arranged into the class hierarchy shown below:
SOMTEntryC
MTClassEntryC
SOMTBaseClassEntryC
SOMTMetaClassEntryC
SOMTConmmonEntryC
SOMTUserDefinedTypeEntryC
SOMTDataEntryC
SOMTMethodEntryC
SOMTParameterEntryC With the exception of SOMTEntryC and SOMTCommonEntryC, all of the entry classes correspond to a specific unit of information in an IDL interface definition. This correspondence is summarized below.
SOMTEntryC The SOMTEntryC class provides attributes for accessing the name of an entry, somtEntryName, somtIDLScopedName, and somtCScopedName, its entry type, that is, whether it represents a class, method, attribute, typedef, etc., somtElementType and somtElementTypeName, its comment, somtEntryComment, the line number in the idl file where the entry is defined, somtSourceLineNumber, its type code, somtTypeCode, and whether the entry represents a reference to an entry rather than its definition, somtIsReference.

The SOMTEntryC class also provides methods for accessing the SOM IDL modifiers specified in the "implementation" section of an "interface" statement. Included are the methods:

somtGetModifierValue,
somtGetFirstModifier,
somtGetNextModifier,
somtFormatModifier, and
somtGetModifierList When invoked on an instance of SOMTClassEntryC, these methods pertain to the class's modifiers; when invoked on an instance of SOMTMethodEntryC, they pertain to the method's modifiers, and so on.

The SOMTEntryC class also provide the somtSetSymbolsOnEntry method, which can be used to create symbols and define their corresponding values for use in the output template. For example, SOMTClassEntryC's implementation of somtSetSymbolsOnEntry establishes the symbol "className" containing the name of the current class, SOMTMethodEntryC's implementation of somtSetSymbolsOnEntry defines the "methodname" symbol, and so on.
SOMTCommonEntryC Entry objects that an emitter uses are actually instances of one of the subclasses of SOMTCommonEntryC, rather than of SOMTCommonEntryC itself. These subclasses are the classes SOMTMethodEntryC, SOMTDataEntryC, SOMTUserDefinedTypeEntryC, and SOMTParameterEntryC.

The SOMTCommonEntryC class provides attributes and methods for obtaining information about the type of a method, parameter, user-defined type, attribute declarator, struct member declarator, or instance variable. For example, it provides the attribute somtTypeObj whose value is a pointer to a SOMTEntryC object representing the type, the attribute somtType that gives a string representation of the type, the attribute somtArrayDimString that indicates array dimensions, and the attribute somtPtrs that gives the number of stars associated with a pointer type.

The SOMTCommonEntryC class also provides methods for accessing type information: somtGetFirstArrayDimension, somtGetNextArrayDimension, somtIsArray, and somtIsPointer.
SOMTClassEntryC A SOMTClassEntryC object anchors the entire interface definition for a class. That is, all the parts of a class's interface definition are reachable from the class entry, SOMTClassEntryC object, that represents it. When an emitter is run on a class's interface definition rather than on a module, the emitter has a distinct class entry called the target class entry which represents that class.

The SOMTClassEntryC class provides attributes corresponding to the following characteristics of an IDL interface specification:

Its source file name, somtSourceFileName;
Its metaclass, somtMetaClassEntry;
The class this class is a metaclass for, if any, somtMetaClassFor;
Whether the entry represents a forward declaration of the class, rather than its definition, somtForwardRef;
The module that contains the class, if any, somtClassModule;
The number of methods the class introduces somtNewMethodCount, or overrides, somtOverrideMethodCount;
The number of static methods the class introduces, somtStaticMethodCount;
The number of procedure methods the class introduces, somtProcMethodCount;
The number of variable argument methods the class introduces, somtVAMethodCount;
The number of parent (base) classes, somtBaseCount.
The class also provides methods for accessing each of a class's:

parent (base) classes (somtGetFirstBaseClass and somtGetNextBaseClass);
release order names (somtGetFirstReleaseName, sontGetNextReleaseName, and somtCetReleaseList);
data items (somtGetFirstData and somtGetNextData);
passthrus (somtGetFirstPassthru and somtGetNextPassthru);
methods (somtGetFirstMethod, somtGetNextMethod, somtGetFirstInheritedMethod, and somtGetNextInheritedMethod);
constants somtGetFirstConstant and somtGetNextConstant);
attributes (somtGetFirstAttribute andsomtGetNextAttribute);
typedefs (somtGetFirstTypedef and somtGetNextTypedef);
structs (somtGetFirstStruct and somtGetNextStruct);
unions (somtGetFirstUnion and somtCetNextUnion);
enumerations (somtGetFirstEnum and somtGetNextEnum); and
sequences (somtGetFirstSequence and somtGetNextSequence) SOMTClassEntryC also provides methods for accessing all type/constant definitions in the order in which they were defined, including structs, unions, enumerations. These methods are somtGetFirstPubdef and somtGetNextPubdef. Finally, the SOMTClassEntryC class provides filter methods for determining whether a method is new (somtFilterNew) or overridden (somtFilterOverridden).

SOMTBaseClassEntryC

Every class entry holds a pointer to a base class entry, SOMTBaseClassEntryC object, for each of the class's direct base (parent) classes. The base class entry is not the class entry for a base class. Rather, it is an object that has an attribute, somtBaseClassDef, whose value is the class entry for the base class.

SOMTMetaClassEntryC

Every class entry holds a pointer to its metaclass entry, the SOMTMetaClassEntryC object, if the class number includes the.idl file for its metaclass. A metaclass entry is like a base class entry in that it is not the class entry for the metaclass. Rather, it is an object that has an attribute, somtMetaClassDef, whose value is the class entry for the metaclass. The metaclass entry also has an attribute, somtMetaFile, that specifies the file in which the metaclass's interface is defined.

SOMTModuleEntryC

A SOMTModuleEntryC object represents a module within an IDL specification.

It provides methods for accessing each of the module's:
interfaces (somtGetFirstInterface and somtGetNextInterface); nested modules (somtGetFirstModule and somtGetNextModule); constants (somtGetFirstModuleConstant and somtGetNextModuleConstant); typedefs (somtGetFirstModuleTypedef and somtGetNextModuleTypedef); structs (somtGetFirstModuleStruct, somtGetNextModuleStruct); unions (somtGetFirstModuleUnion and somtGetNextModuleUnion); enumerations (somtGetFirstModuleEnum and somtGetNextModueEnum); and sequences (somtGetFirstModuleSequence, somtGetNextModuleSequence).

SOMTModuleEntryC also provides methods for accessing the all of the definitions in the order in which they were defined. These methods are somtGetFirstModuleDef and somtGetNextModuleDef.

SOMTPassthruEntryC

Every class entry holds a pointer to a passthru entry SOMTPassthruEntryC object) for each passthru specification in the implementation section of the class's SOM IDL interface specification. Each passthru entry has attributes representing the target (somtPassthruTarget), the target language (somtPassthruTargetLanguage), the passthru's contents (somtPassthruBody), as well as a method (somtIsBeforePassthru) for determining whether the passthru is a "before" or "after" passthru.

SOMTTypedefEntryC

Every class entry holds a pointer to a typedef entry (SOMTTypedefEntryC object) for each typedef introduced within the class's interface specification and for each member of a user-defined struct. Each typedef entry provides an attribute representing the base type (somtTypedefType) of the typedef and methods for accessing each of the declarator names of the typedef (somtGetFirstDeclarator and somtGetNextDeclarator). Because a single typedef may have several declarators (that introduce several user-defined types), the somtTypedefType attribute of a typedef gives only the base type of the user-defined types; to get the full type, users should access each declarator in turn and get its somtType attribute.

SOMTDataEntryC

Every class entry holds a pointer to a data entry (SOMTDataEntryCobject) for each of the data members (internal instance variables) specified in the implementation section of the class's interface definition, and for each attribute declarator or struct member declarator. The SOMTDataEntryC class provides an attribute, somtIsSelfRef, that indicates whether a struct member declarator is self-referential (pointing to the same type of structure for which it is a declarator).

SOMTAttributeEntryC

Every class entry holds a pointer to an attribute entry (SOMTAttributeEntryC object) for each of the attribute definition statements within the class's interface specification. Each attribute entry has attributes representing the base type (somtAttribType) and whether the attribute is read only (somtIsReadonly). It also provides methods for accessing the attribute declarators (somtGetFirstAttributeDeclarator and somtGetNextAttributeDeclarator) and their get/set methods (somtGetFirstGetMethod, somtGetNextGetMethod, somtGetFirstSetMethod, and somtGetNextSetMethod).

Because a single attribute definition statement may have several declarators which introduce several attributes, the somtAttribType attribute gives only the base type of the attributes being defined; to get the full type, users should access each declarator in turn and get its somtType attribute.

SOMTMethodEntryC

A class entry holds a pointer to a method entry SOMTMethodEntryC object, for each of the methods the class supports both new and inherited methods. Each method entry has attributes representing:

The C/C++ form of the method's return type, somtCReturnType;

Whether the method has a va_list parameter somtIsVarags;

For overriding methods, the class whose implementation is being overridden, somtOriginalClass, and the method being overridden, somtOriginalMethod;

Whether the method is "one way", somtIsOneway;

The number of arguments to the method, somtArgCount; and

The context string literals of the method, somtContextArray.

The SOMTMethodEntryC class also provides methods for getting the method's parameters, somtGetFirstParameter, somtGetNextParameter, somtGetNthParameter, somtGetIDLParamList, somtGetShortCParamList, somtGetFullCParamList, somtGetShortParamNameList, somtGetFullParamNameList.

SOMTParameterEntryC

Method entries contain a reference to a parameter entry, SOMTParameterEntryC object, for each of the explicit parameters to the method. The receiver of the method generally does not have a corresponding parameter entry; neither do the Environment and Context parameters. Each parameter entry has an attribute, somtParameterDirection, which indicates whether it is an in, out or inout parameter, and attributes that give the parameter's declaration within a prototype, somtIDLParameterDeclaration and somtCParameterDeclaration.

SOMTConstEntryC

Every class entry holds a pointer to a constant entry SOMTConstEntryC object for each constant defined within the class's interface specification. Each constant entry has attributes that represent the type, somtConstType and somtConstTypeObj, and the value, somtConstIsNegative, somtConstStringval, somtConstNumval, somtConstval, and somtConstNumNegVal, of the constant.

SOMTEnumEntryC

Every class entry holds a pointer to an enum entry, SOMTEnumEntryCobject, for each enumeration defined within the class's interface specification. Each enum entry provides methods for getting the enumerator names for the enumeration, somtGetFirstEnumName and somtGetNextEnumName.

SOMTSequenceEntryC

Every class entry holds a pointer to a sequence entry, SOMTSequenceEntryC object, for each sequence defined within the class's interface specification. Each sequence entry has attributes representing the sequence's length, somtSeqLength, and type, somtSeqType.

SOMTStringEntryC

Every class entry holds a pointer to a string entry, SOMTStringEntryC object, for each string defined within the class's interface specification. Each string entry has an attribute representing the string's length, somtStringLength.

SOMTUnionEntryC

Every class entry holds a pointer to a union entry, SOMTUnionEntryCobject, for each union defined within the class's interface specification. Each union entry provides an attribute representing the union's switch type, somtSwitchType and methods for accessing each of its cases, somtGetFirstCaseEntry and somtGetNextCaseEntry.

SOMTEnumNameEntryC

Every enumeration entry of type SOMTEnumEntryC holds a pointer to a SOMTEnumNameEntryC object for each enumerator name defined within it. Each SOMTEnumNameEntryC entry has attributes representing the numerator name's value, somtEnumVal, and a pointer to the enumeration that defines the enumerator name, somtEnumPtr.

SOMTStructEntryC

Every class entry holds a pointer to a struct entry, SOMTStructEntryCobject for each struct defined within the class's interface specification and for each exception the class defines Each struct entry provides attributes that represent the class in which the struct was defined, somtStructClass, and whether the struct actually represents an exception, somtIsException, and methods for accessing each of the struct members, somtGetFirstMember and somtGetNextMember.

SOMTUserDefinedTypeC

Every class entry holds a pointer to a user-defined type entry, SOMTUserDefinedTypeEntryC object, for each type defined within the class's interface specification via a typedef statement. Each user-defined type entry provides attributes representing the typedef statement that defined the type, somtOriginalTypedef, and the base type of the user-defined type, somtBaseTypeObj. The somtBaseTypeObj attribute gives the primitive IDL type, e.g., float, short, char, etc., that underlies a user-defined type, skipping over any intermediate user-defined types.

The Object Graph Builder Once the abstract syntax graph has been constructed by the SOM IDL parser, the object graph builder traverses the abstract syntax graph, building an isomorphic graph of entry objects. For each node, or struct, in the abstract syntax graph, the object graph builder constructs an instance of the appropriate entry class, e.g., SOMTClassEntryC, SOMTModuleEntryC, SOMTMethodEntryC, etc., as a node in the object graph. This is done by "wrapping" each struct with an object —creating a new object and initializing its state using the data contained in the struct.

In the preferred embodiment, both the IDL parser and the object graph builder are closed parts of the Emitter Framework; they cannot be extended or modified by programmers using the Emitter Framework. Two important forms of flexibility as discussed above are provided:

1. SOM IDL syntax provides for an open-ended set of "modifiers" that can be associated with most syntactic elements in an interface definition.

2. Before the object graph builder is run, an emitter can cause some or all of the Emitter Framework classes to be "shadowed", effectively replaced by user-defined subclasses.

The object graph builder constructs the object graph piecemeal as each node in the object graph is needed. In this way, those portions of the object graph that are not required by a particular emitter are not constructed, resulting in a significant time and space savings. In other words, the object graph may only be partially constructed at any particular time during the execution of an emitter, and its size may change as execution proceeds and more nodes are required.

The Object Graph

Each node of the object graph is an entry object, i.e., an instance of one of the entry classes described above, e.g., SOMTClassEntry, SOMTMethodEntryC, etc., that represents one syntactic unit of the interface definition. For example, a SOMTClassEntryC object represents an entire interface definition, SOMTMethodEntryC objects represent method declarations, SOMTParameterEntryC objects represent method parameter declarations, and so on. For each node or struct, in the abstract syntax graph, there is a corresponding node, or entry object, in the object graph. In other words, the abstract syntax graph and the object graph are isomorphic. Hence, given the example abstract syntax graph described above, the corresponding object graph would contain one instance of the SOMTClassEntryC class representing MyClass, one instance of the SOMTBaseClassEntryC class representing SOMObject, one instance of the SOMTMethodEntryC class representing myMethod, one instance of the SOMTParameterEntryC class representing parameter x, and so on. The entry object contains all the information contained in its corresponding struct in the abstract syntax graph. The advantage of the entry objects is that they hide the data structures generated by the SOM IDL parser, thus, insulating users from changes to those structures. The entry objects also provide additional data and methods as a convenience to the users of the Emitter Framework.

The Emitter Class (SOMTEmitC)

The emitter class, SOMTEmitC, is the class that manages the process of producing an output file by obtaining information from the entry objects and directing the template object (of class SOMTTemplateOutputC) to produce specific sections.

Constructing a new emitter requires creating a new subclass of SOMTEmitC and overriding one or more of its methods, principally, the somtGenerateSections method, so that it produces the desired output. The new emitter is run by creating an instance of the new subclass of SOMTEmitC and invoking the somtGenerateSections method on it. An instance of SOMTEmitC, i.e., an emitter, has as its attributes, a target file, a target class or target module, a template object, and a name. The target file is the file to which output will be directed. The target class, the class about which information will be emitted, is represented by an object of class SOMTClassEntryC. This object is the root of the object graph built by the object graph builder when the emitter is invoked on a class definition. The target module, the module about which information will be emitted, is represented by an object of class SOMTModuleEntryC. This object is the root of the object graph built by the object graph builder when the emitter is invoked on a module definition. The template object of the emitter, an instance of SOMTTemplateOutputC, maintains the symbol table and controls the format and content of the sections that the emitter produces. The emitter itself controls which sections are actually emitted and their order, within its implementation of the SOMTGenerateSections method. The template object (of class SOMTTemplateOutputC) is initialized from the output template file.

The emitter name is the name by which the emitter is invoked. The emitter name is used to determine which passthrus in the input .idl file are directed to that emitter. The SOMTEmitC class provides methods for:

Opening the output template file, somtOpenSymbolsFile;
Getting the value of global modifiers;
Setting standard symbols associated with the target class and its metaclass, somtFileSymbols, as well as setting standard section-name symbols, somtSetPredefinedSymbols;
Generating the output file from the output template, somtGenerateSections. The somtGenerateSections method is the primary method that a new emitter will override from SOMTEmitC. This method controls which sections will be emitted and in what order.

The SOMTEmitC class also provides methods for emitting different standard sections of an output file. The standard sections are as follows.

Prolog—Describes text to be emitted before any other sections.
Base Includes—Determines how base or percent class #include statements are emitted.
Meta Include—Determines how a metaclass #include statement is emitted.
Class—Determines what information about the class as a whole is emitted.
Base—Determines what information about a base parent classes of a class is emitted bases.
Meta—Determines what information about the class's metaclass is emitted.
Constant—Determines what information about user-defined constants is emitted.
Typedef—Determines what information about user-defined types is emitted.
Struct—Determines what information about user-defined structs is emitted.
Union—Determines what information about user-defined unions is emitted.
Enum—Determines what information about user-defined enumerations is emitted.
Attribute—Determines what information about the class's attributes is emitted.
Methods—Determines what information about the methods of a class is emitted.
Release Determines how information about the release order statement of a class definition is emitted.
Passthru—Determines what information about passthru statements is emitted.
Data—Determines what information about internal instance variables of a class is emitted.
Interface—Determines what information about the interfaces in a module is emitted.
Module—Determines what information about a module is emitted.
Epilog—Describes text to be emitted after all other sections are emitted.

Some sections apply to a variable number of items that must be dealt with iteratively. This can be true of the base'section since a class can have more that one base class, as well as the sections for base class includes, data, passthru, attribute, constant, typedef, struct, union, enum, interface, module, and method. These repeating sections can be preceded by a prolog, information to be emitted prior to iterating through the items, and followed by an epilog, information to be emitted after iterating through the items.

The SOMTEmitC class provides methods for emitting each of the sections described above. For example, the somtEmitProlog method emits the prologS section, the somtEmitClass method emits the classS section, and so on. For repeating sections, the SOMTEmitC class provides scanning methods. These scarning methods first emit the appropriate prolog section, then iterate through the appropriate items in the interface definition, emitting the appropriate section for each item, then emit the appropriate epilog section.

User-defined subclasses of SOMTEmitC can override the section-emitting methods to change the way that a particular section is emitted. They can also define new section-emitting methods.

Finally, the SOMTEmitC class provides several filter methods. These methods return TRUE or FALSE depending on some characteristic of a specified entry object. For example, the somtNew method determines whether the specified method is introduced by the emitter's target class. These filter methods can be used as arguments to the somtScanMethods method to control which methods are processed in a repeating section.

The Template Facility

The template facility, implemented by the SOMTTemplateOutputC class, makes the specification of the output file simple. Most of the information about how the output file should look can be placed in a template definition and does not need to be embedded in the emitter code. The template facility is supported by the template class, SOMTTemplateOutputC. An instance of this class is used by an emitter to produce output. It manages the output of specific sections to the target output file.

The SOMTTemplateOutputC class handles as much as possible of the formatting part of emitter writing, largely by using symbol-based output templates. A symbol is a name used to represent a corresponding value. For example, the symbol (cr symbol name) "className" is recognized by the Emitter Framework as representing the name of the target class.

The SOMTTemplateOutputC class provides methods for:
Setting and getting the value of symbols in a template object's symbol table, somtGetSymbol, somtSetSymbol, somtSetSymbolCopyName, somtSetSymbolCopyValue, somtSetSymbolCopyBoth, somtCheckSymbol, and somtExpandSymbol;
Emitting a particular section of the output template, somtOutputSection;
Emitting a comment, somtOutputComment;
Reading the output template file, somtReadSectionDefinitions.
Template Definitions The templatedefinitions which are specified by either the emitter writer and/or the emitter user describe the content and format of various sections of the output file, and the emitter controls which of these sections are output and in what order. The emitter calls on an instance of the SOMT-TemplateOutputC class to have a particular section produced from that section's template definition.

An emitter writer uses symbol names as placeholders in a text template that patterns the desired output. The template object, of class SOMTTemplateOutputC, takes a text template containing symbol names and produces output by substituting data from the emitter for the symbol names that occur in the text template. The values that replace the symbol names come from a symbol table maintained by the template object. A symbol value can be any string of text and can change as the emitter execution changes. The emitter is responsible for update changes to the symbol value in the symbol table.

The template file is divided into sections that specify the desired output for each syntactic unit of the input IDL specification. To generate a particular section of an output file, an emitter first sets, i.e., defines, the values of appropriate symbols in its template-object's symbol table, and then specifies to the template object the name of a section to be output. This design results in a good separation between decision logic and format specification. Also, because the format specification is isolated, its readability and maintainability are greatly enhanced.

Following is an example fragment of a text template containing two template sections, "classS" and "metaS". The text template is stored in a template file associated with the emitter.

```
:classS
class: <className><, classMods, . . . >;
?<-- classComment>
:metaS
    metaclass: <metaName>
```

New sections are denoted by lines that begin with a colon. The above fragment contains two sections, "classs" and "metaS". By convention, section names end in capital "S". An emitter uses the section name to specify to the template object which part of the output file to emit. Lines that begin with a question mark are emitted only if at least one symbol appearing on the line is defined with a nonblank value. Other lines are emitted unconditionally.

Symbol names are specified in a template file in angle brackets. Thus, the template above contains the symbols "className", "classMods", "classComment", and "metaName". A backslash can be used to escape an angle bracket when it is not intended to indicate a symbol. When a template section is emitted, symbols are replaced with their values. If the symbol has no value, then the symbol name is replaced by the string "symbol <. . . > is not defined", but no error is raised.

In addition to simple symbol name substitution, two forms of complex symbol substitution are supported. These are list substitution and comment substitution. Each of these involves special syntax.

Comment substitution is specified with two dashes preceding the symbol name, for example, <- - symbolName>. When comment substitution is used to emit a symbol, the symbol's value is emitted in comment form. The emitter controls the format for comments by setting the values of its template (SOMTTemplateOutputC) object's somtCommentStyle and somtCommentNewline attributes. The somtCommentStyle attribute determines whether comments are emitted with "- -" at the start of each line, somtDashesE, with "//" at the start of each line somtCPPE, in simple C style with each line wrapped in "/*" and "*/", somtCSimpleE, or in block C style with a leading "/*", then a "*" on each line and a final "*/", somtCBlockE. Other comment style attributes would occur to those skilled in the art. The somtCommentNewline attribute is a Boolean that determines whether the comment starts on a new line.

List substitution replaces a symbol with its value expressed in list form, using specified delimiters. The symbol's value must consist of a sequence of items, separated by newline characters. The list substitution specification consists of two pieces of information in addition to the symbol name: the prefix to put in front of non-empty lists, and the delimiter to put between list items.

All characters before the symbol name are taken as the prefix, and all characters after the symbol name and before the required ". . ." which indicates that list substitution is to be used are taken as the separator characters. Thus <: symbolName, . . . > specifies a prefix of ":" and a separator of ", ". The prefix and separator characters must consist of blanks, commas, colons, and semicolons. The value of the template, object's somtLineLength attribute controls how many list items are emitted on each line. Within an output template, tabbing can be specified by <@dd>, where dd is a valid positive integer representing a column number. After a <@dd> is encountered in the output template, the next character emitted will appear in the specified column. Emitting the "classS" and "metas" sections from the above template, using the following IDL specification as input:

```
#include <somobj.idl>
#include <mhello.idl>
interface Hello : SOMObject /* This is the interface for
Hello. */
    {
        implementation {
        metaclass = M_Hello;
        functionprefix = "hello_";
        filestem = hello;
        . . .
        };
    };
would produce the following output:
    class: Hello, functionprefix = hello_, filestem =
    hello;
    // This is the interface for Hello.
    metaclass: M_Hello
```

As mentioned above, the formatting of comments varies, depending on the attributes of the emitter's template, the SOMTTemplateOutputC object.

Figure 5:
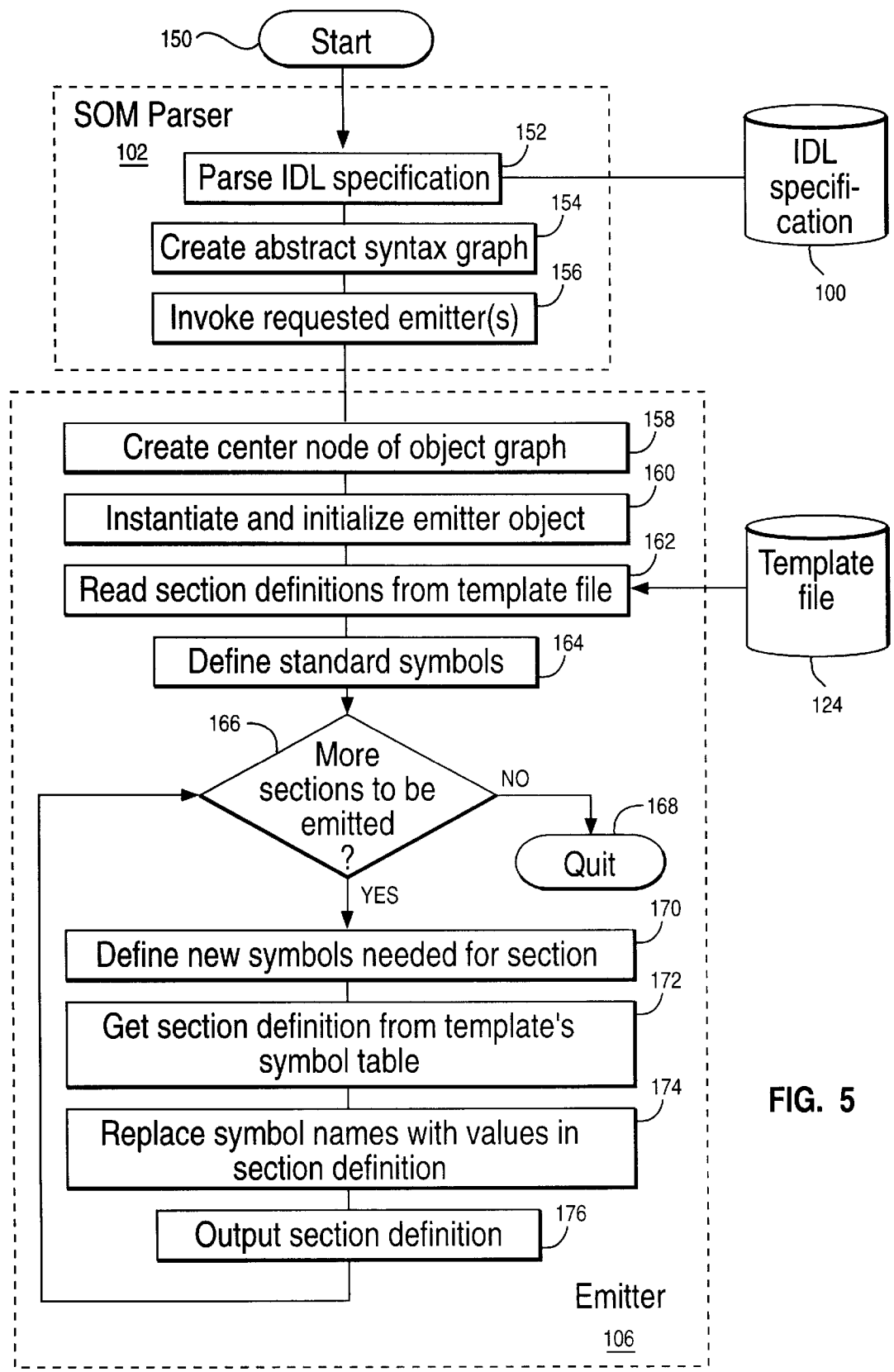
FIG. 5 is a flow diagram of a control flow of an emitter written using the emitter framework.

The preceding description will be more fully understood with reference to the flow diagrams in FIGS. 5 to 11. The overall control flow of running an emitter written using the emitter framework is depicted in FIG. 5, wherein the process begins in step 150 with the request to produce a new output file from an interface definition written in IDL. In step 152, the IDL specification 100 is parsed by the SOM IDL parser 102. The SOM parser 102 creates the abstract syntax graph in step 154. Then, in step 156, the SOM parser 102 invokes the requested emitters. The emitters are requested via the "-s" option of the "sc" command. For example: Sc- SXX myfile.idl requests the xx emitter, Sc -Syy myfile.idl requests the yy emitter, etc.

Figure 7:
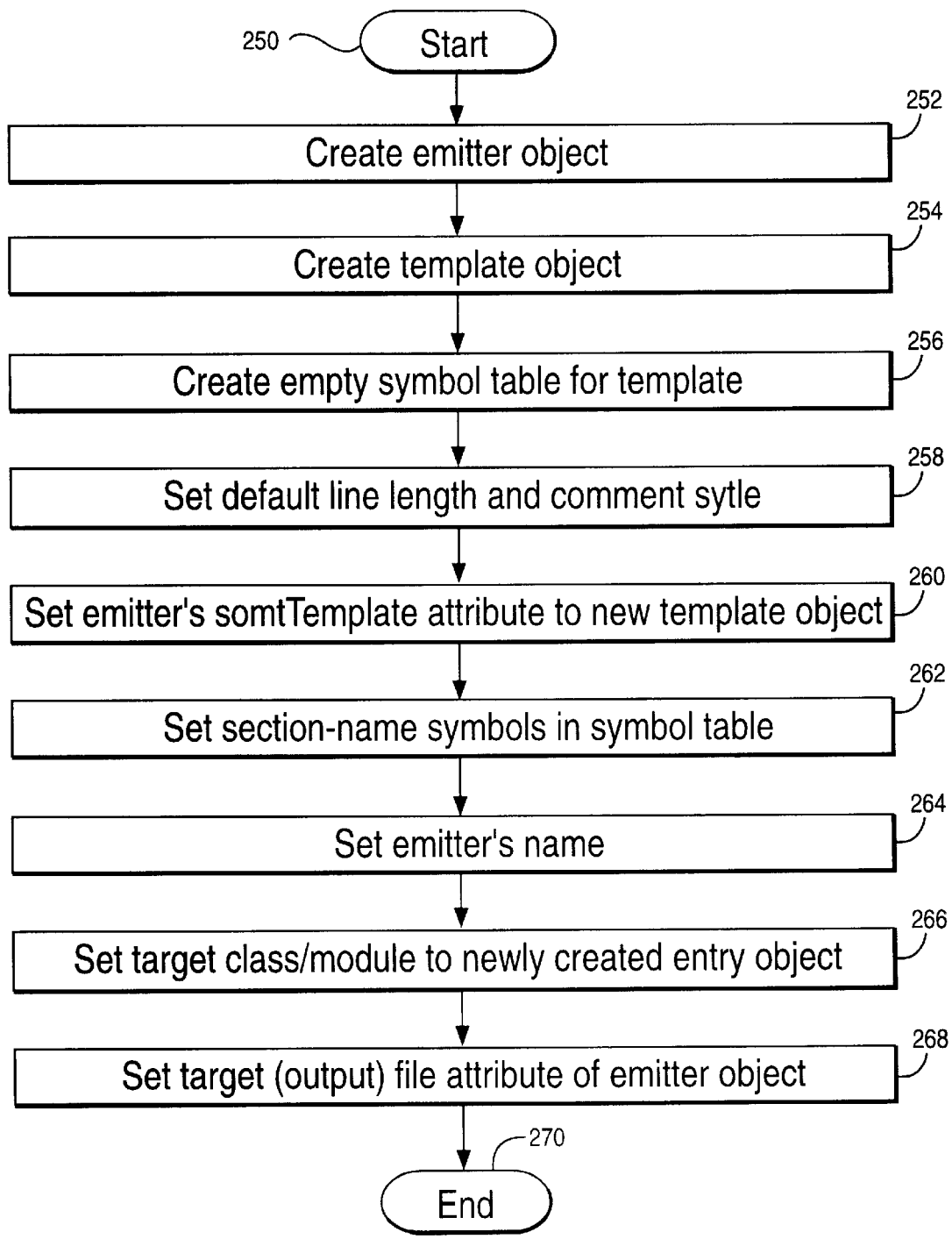
FIG. 7 is a flow diagram of instantiating an emitter.
Figure 8:
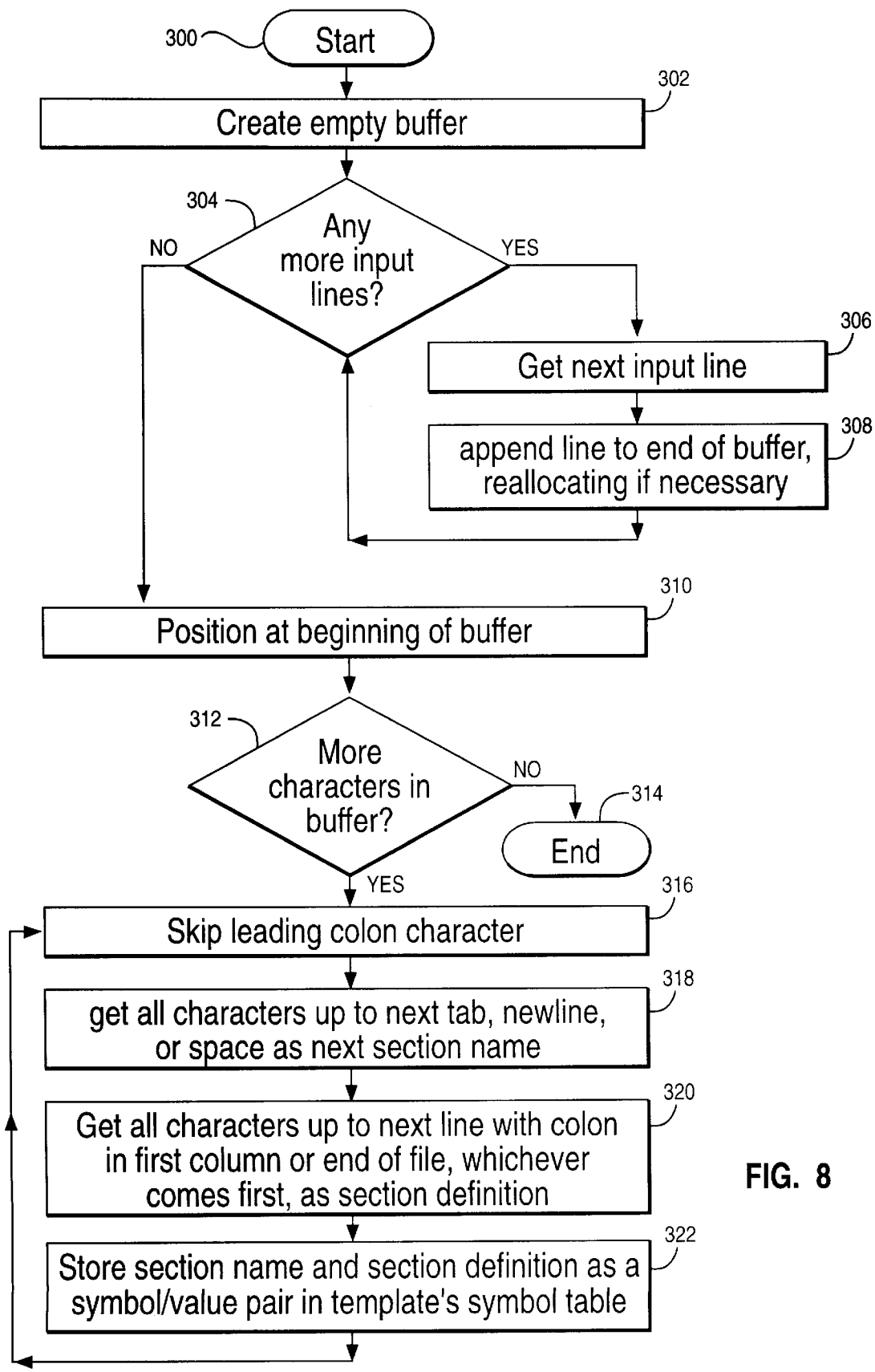
FIG. 8 is a flow diagram of reading section definitions from a template file.

The process then continues to the emitter written using the emitter framework 106. In step 158, the center node of the object graph is created. The center node of the object graph is like the root node in a tree, and corresponds to the node in the abstract syntax graph which is passed by the SOM parser to the emitter. It will be an instance of SOMTClassEntryC or SOMTModuleEntryC. This process is described below in greater detail with reference to FIG. 6. Next, in step 160, the emitter object, of class SOMTEmitC, is instantiated and initialized. This process is depicted in FIG. 7. In step 162, section definitions from the template file 124 are read and stored in the template object, of class SOMTTemplateOutputC. Greater detail on this process is shown in FIG. 8. Next, in step 164, standard symbols are defined. Symbol definition is described below with reference to FIG. 9.

In step 166, a decision is made whether there are more sections to be emitted. Every emitter has a preset list of sections it will emit, as decided by the emitter writer. This step is basically to just "emit all the sections you want to emit". If not, the process ends in step 168. If there is another section of the output to be emitted, in step 170, new symbols are defined if needed for the section of the output. The appropriate section definition is retrieved from the template object's symbol table, step 172, and the symbol names are replaced with values in the section definition, performing list and comment substitution as specified in the template file, step 174. Steps 174 and 176 are preferably performed together during a single pass through the template definition. The step of replacing symbol names with values in a section definition is discussed below referring to FIG. 10. In step 176, the section definition is output. FIG. 11 depicts the process of outputting a section definition. The process returns to step 166 to determine whether more sections are to be emitted. If not, the process ends in step 168.

The processes performed by the emitter 106 in FIG. 5 are discussed in greater detail with reference to FIGS. 6 through 11.

Figure 6:
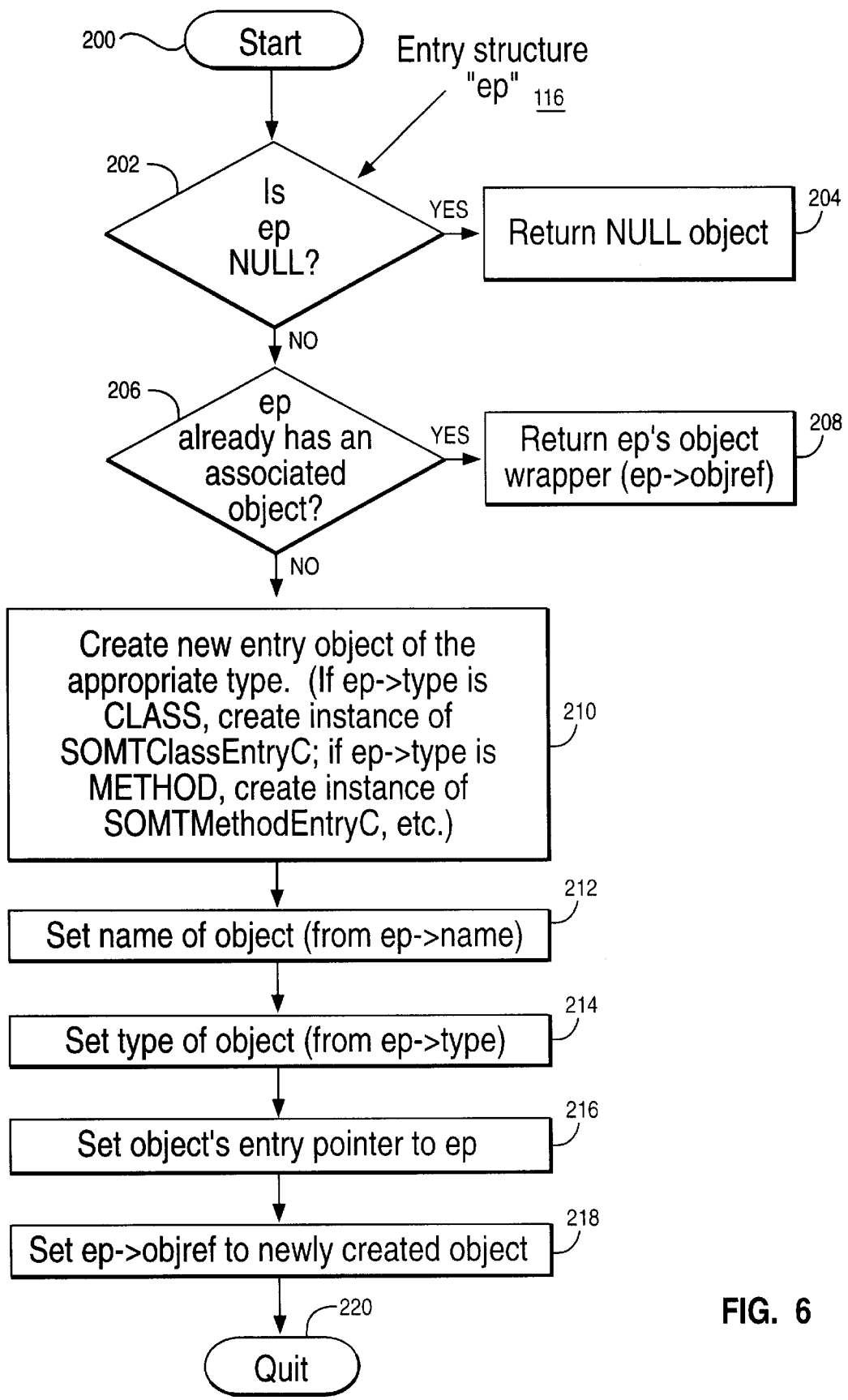
FIG. 6 is a flow diagram of creating a node of the object graph.

The process for creating a node in the object graph which is an object of type SOMTEntryC or one of its subclasses is depicted in FIG. 6. The process begins with step 200 with the reception of the entry structure "EP" 116. In step 202, a test is performed to determine whether EP is null. If so, in step 204, a null object is returned. If EP has a value other than null in step 206 a test is performed to determine whether the entry structure already has an associated object. If the entry structure has an associated object, it is returned with the pointer ep - - - - >object in step 208. If the entry structure does not already have an associated object, in step 210, a new entry object of the appropriate type is created. If the EP - - - - >type pointer is CLASS, an instance of the SOMTClassEntryC method is created. If EP - - - - >type pointer is METHOD, an instance of SOMTMethodEntryC is created. There are many more potential types of entry objects. In step 212, the name of the object is set from the EP - - - - >name pointer. In step 214, the type of the object is set from the EP - - - - - >type pointer. In step 216, the object's entry pointer is set to EP. Steps 212, 214 and 216 are implemented by SOMTEntryC's method "SOMTSetEntryStruct". In step 218, the EP - - - - >object pointer is set to the newly created object. Step 216 is so the entry object can access the data in the entry structure (EP). Step 218 is so that step 206 will succeed if the same entry structure (EP) is encountered again in the abstract syntax graph. The process ends in step 220.

Process for instantiating an emitter is depicted in FIG. 7. The process begins in step 250 and proceeds immediately to step 252 when an emitter object is created which is an instance of the user-defined Subclass of SOMTEmitC according to standard SOM procedures. In step 254, a template object of class SOMTTemplateOutputC is created also using standard SOM procedures. Next, in step 256, an empty symbol table is created and associated with the template object. In step 258, the default line length and comment style attributes of the template object are set to control the format of the emitter's output. The newly created emitter object's SOMTemplate attribute is set to the new template object, step 260, so that the emitter object can access its associated template object and symbol table. Next, the standard section-name symbols are set to standard values in the symbol table in step 262 so that the emitter can use default section names in the template file. In step 264, the emitter's name is set so that passthrus directed toward the emitter will be recognized. In step 266, the target class/modules which is an object of class SOMTClassEntryC or SOMTModuleEntryC is set to the newly created entry object as depicted in FIG. 6 so that the emitter can access information about the class/module about which it is emitting output. In step 268, the target (output) file attribute of the emitter object is set so that the emitter's Section-emitting methods will produce output in the correct file and the process ends in step 270.

In FIG. 8, the process for reading section definitions from a template file into a SOMTemplateOutputC object is depicted. This figure depicts SOMTTemplateouputC's "SOMTReadSectionDefinitions" method. The process begins in step 300 and proceeds to step 302 where an empty buffer is created by the template object. As the system does not know how big a buffer is necessary, a small default buffer is set initially and adjusted if necessary. Step 304 recursively performs a test to determine whether there are any more input lines. If there are more input lines, in step 306, the next input line is received. In step 308, the new line is appended to the end of the buffer and if more buffer space is required in the buffer, it is reallocated. The process returns to step 304 until there no more input lines.

Next, in step 310, the process of reading the buffer into the template object begins as the template object of class SOMTTemplateouputC positions itself at the beginning of the buffer. In step 312, a test is performed to determine whether any more characters are in the buffer. If there are no more characters, the process ends, step 314. If there are more characters in the buffer, in step 316, the template object skips to the next colon character. A colon character indicates the beginning of a new Section definition. In step 318, all the characters up to the next tab, new line or space are retrieved as the next section name. Next, in step 320, all the characters up to the next line with the colon in the first column, or the end of the file, whichever comes first, are received as the section definition. In step 322, the section name and section definition are stored as a symbol/value pair in the template's symbol table, the process returns to step 312 until there are no more characters in the buffer.

Figure 9:
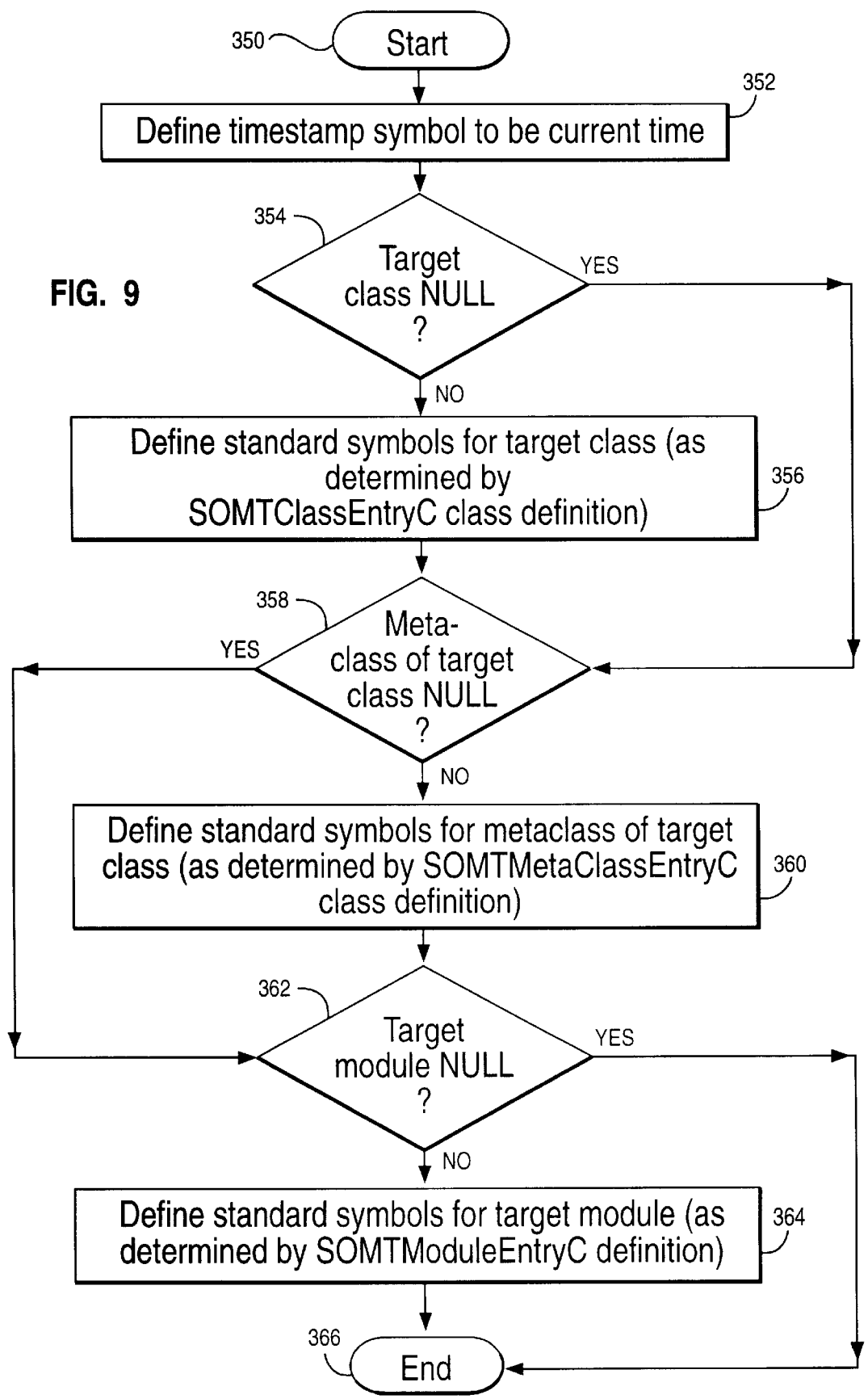
FIG. 9 is a flow diagram of defining standard symbols.

In FIG. 9, the process for defining standard or default symbols is depicted. Symbols are defined initially because the symbol table is empty. This step, done by SOMTEmitC's "SOMtFileSymbols" methods, defines the ones used by most emitters. Then emitters are free to define their own. The process begins in step 350 and proceeds to step 352 where the time stamp symbol is defined to be the current time. In step 354, a test is determined whether the target class is equal to null. In the preferred embodiment, there is either a target class or a target module, but not both. If the target class is not set to null, in step 356, the standard symbols are defined for the target class as determined by the SOMTClassEntryC implementation of the SOMTSetSymbolsOnEntry method. To define a new symbol, the value of the symbol is calculated and stored as a symbol name/value pair in the template's symbol table using SOMTTemplateOutputC's "SOMTSetSymbol" method or one of its other symbol setting methods. Such symbol values are typically calculated using the attributes of the entry objects in the entry graph, which is anchored by the emitter's target class/module which is an object of class SOMTClassEntryC or SOMTModuleEntryC. These attributes are in turn calculated from the members of the entry struct in the abstract syntax graph to which the entry object corresponds. Next, in step 358, a test is performed to determine whether the metaclass of the target class is null. If not, in step 360, the standard symbols for the metaclass for the target class are defined as determined by the SOMTMetaClassEntryC, implementation of SOMTSetSymbolsOnEntry. Next, in step 362, a test is performed to determine whether the target module is set to null, if not, in step 364, standard symbols for the target module are defined as determined by the SOMTModuleEntryC implementation of SOMTSetSymbolsOnEntry. The process ends in step 366.

Figure 10B:
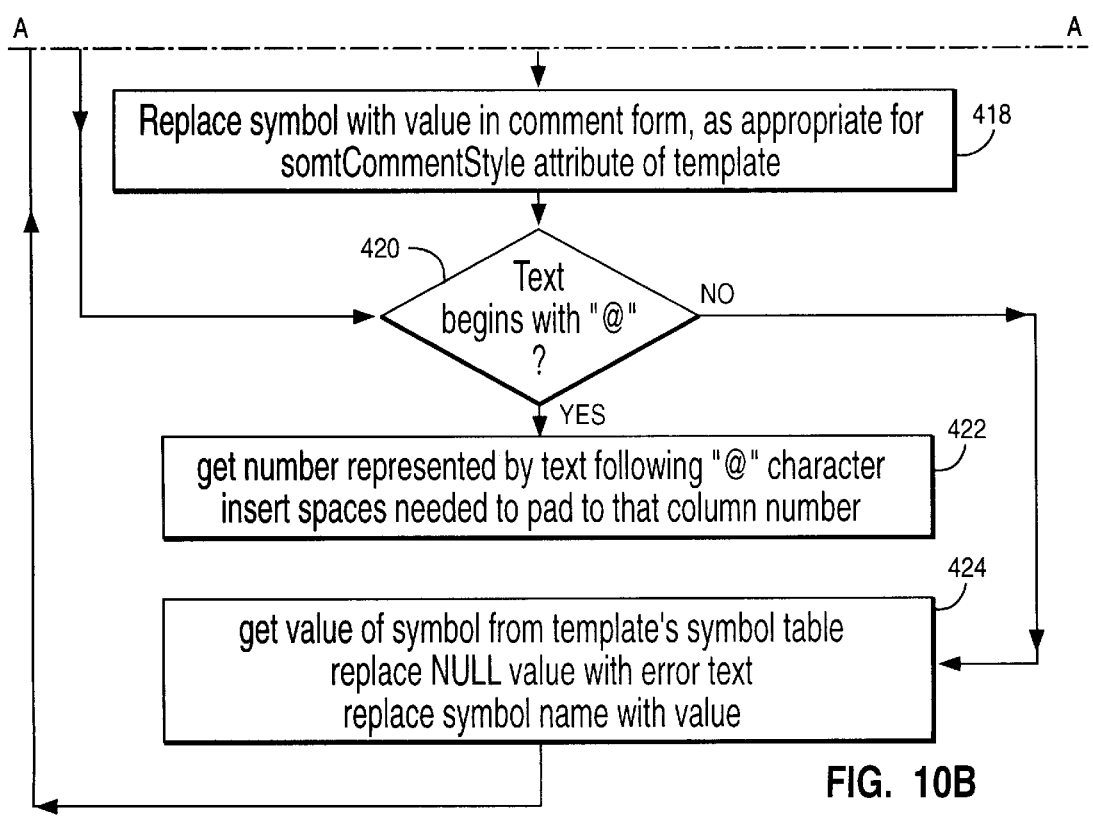
FIG. 10 is a flow diagram of replacing symbol names with values in a section definition.
Figure 10A:
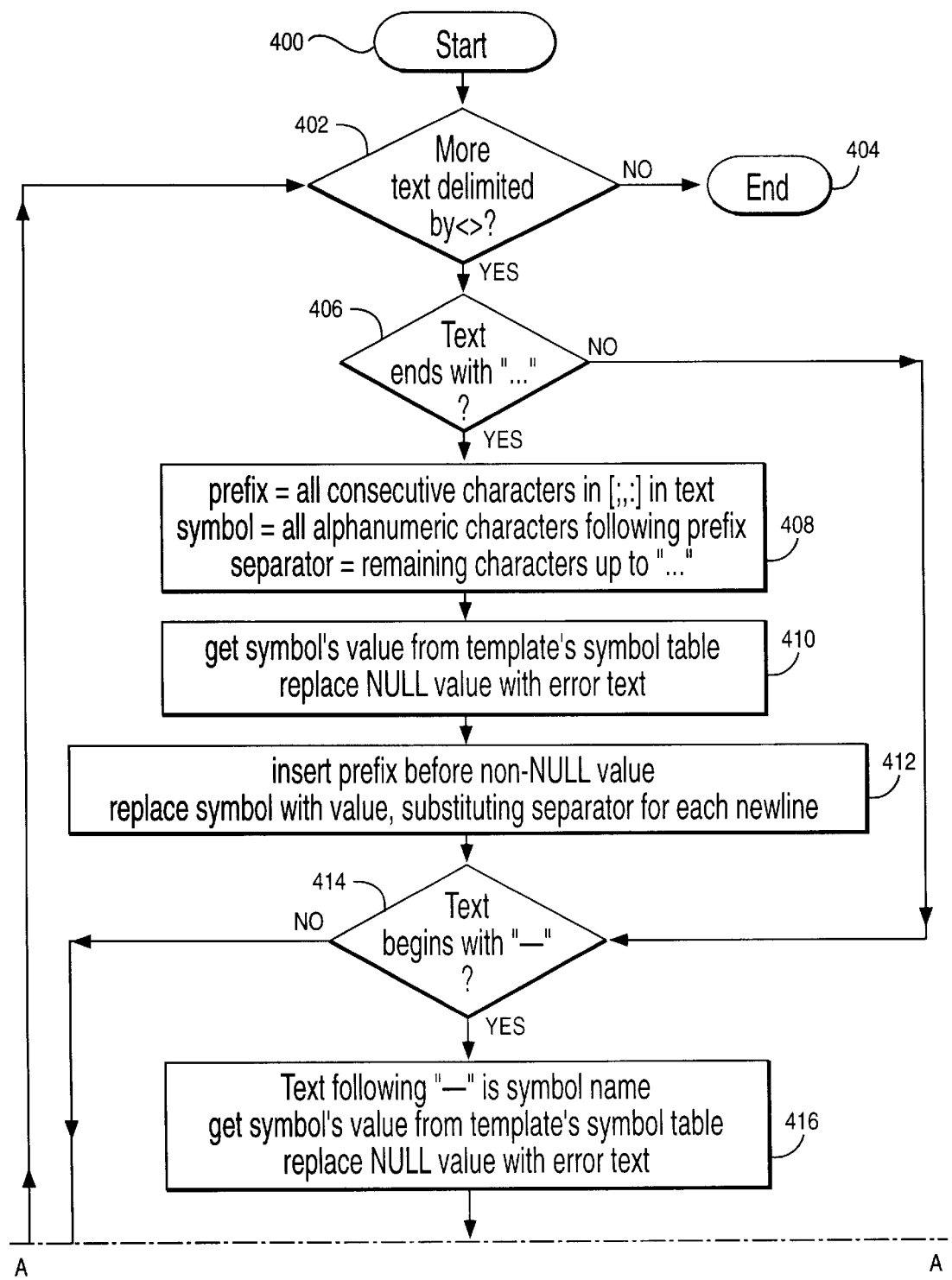
Figure 11:
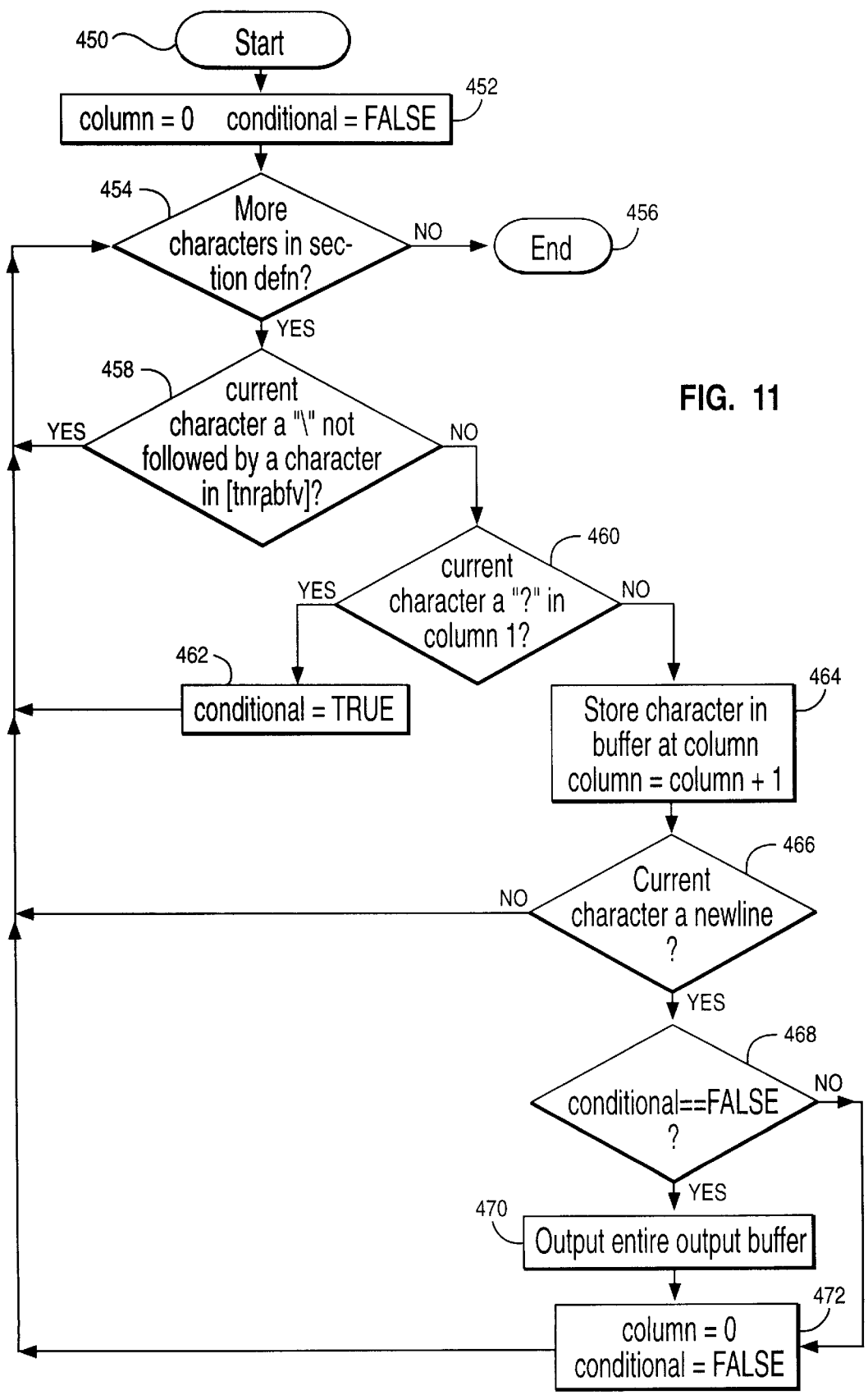
FIG. 11 is a flow diagram of outputting a section definition.

The process for replacing symbol names with values in the section definition is depicted in FIG. 10. The process begins in step 400 and proceeds to the test in step 402 where a search for text delimited by "<> " exists in this section. If there is no such text limited by the arrows, the process ends in step 404. If there is such text, in step 406, a test is performed to determine whether the text ends with ". . . ". If the text ends in ". . . ", this indicates that a list substitution is to take place. If this is true, in step 408, the prefix is set to the consecutive characters following the left arrow composed on semicolons, commas or colons preceding the text. The symbol is set to all the alphanumeric characters following the prefix, and the separator is set to all the remaining characters up to the ". . . ". In step 410, the symbol value from the template's symbol table is retrieved. If there is a null value, the null value is replaced with error text. In step 412, the prefix is inserted before a non-null value, the symbol is replaced with its value, and a separator is substituted for each new line character within the symbol's value.

In step 414, a test is performed to determine whether the text begins with a "- - ", which indicates that a comment substitution is to take place. If this is true, in step 416 the text following the "- - " is the symbol name. The symbol's value is retrieved from the template's symbol table. If there is a null value, it is replaced with error text. In step 418, the symbol is replaced with the symbol value in comment form as appropriate for the somtCommentStyle attribute of the template object of class SOMTTemplateOutputC.

If, on the other hand, the text in a section definition begins with a "@", a tab request is indicated. In step 422, the number following the @ character is received and the spaces needed to tab to that column number are inserted. The process returns to step 402 to search for more symbol names in the section definition. In step 424, the value of the symbol is received from the template's symbol table, a null value is replaced with error text and the symbol name is replaced with the value.

The process for outputting a section definition is depicted in FIG. 11. The process begins in step 450 and proceeds immediately to step 452, where the column and conditional variables are set. The column is initially set to zero and the conditional variable is a false. These initial variable settings have to do with outputting the section definition to a buffer. The column variable is incremented with each character. When a new line character is to be output, the entire buffer will be output as long as conditional set to false, that is, if the first character in the buffer is not a question mark. The process continues to the test in step 454 to determine whether there are more characters in the section definition, if not, the process ends in step 456. If there are more characters, in step 458 a test is performed to determine whether the current character is a "\" not followed by a character in the string "TNRABFV". If the character meets the test in step 458, nothing is output and the process continues in step 454 to look for more characters in the section definition. If the character fails the test in 458, the process proceeds to step 460 to determine whether the current character is a question mark in the first column. If it is a question mark, in step 462, conditional is set to true and the process returns to step 454. The "?" indicates conditional output but is not part of the output itself. The "\" is, in some cases, a "backquote" character that tells the template object to output the next character verbatim, but the "\" is not part of the output itself.

If neither of the tests in steps 458 and 460 are satisfied, the character is stored in the output buffer at column, and column is incremented by 1. In step 466, a test is performed to determine whether the current character is a new line. If not, the process returns to step 454 to search for new characters in the section definition. If it is a new line, in step 468, a test is performed whether conditional equals false. If the line contains any valid symbol substitutions as determined during the computation shown in the previous figure. If the test is satisfied, the entire output buffer is output, in step 470, to the emitter's target file. In step 472, the column variable is set to zero and the conditional variable is set to false and the process returns to step 454 to search for more characters in the section definition.

A sample interface definition of a new emitter class, myemit.idl, the new emitter class implementation for that idl specification, myemit.c, the driver program for the new emitter, myemit.c, and the template file for the new emitter, myemit.efw, are given as examples below.

myemit.idl (the interface specification of the new emitter class)

```
#ifndef myemit_idl
#define myemit_idl
    include <scemit.idl>
    Interface MyEmitter : SOMTEmitC
    {
    #ifdef __SOMIDL__
        implementation {
            //# Class Modifiers
            filestem = myemit;
            callstyle = oidl;
            //# Method Modifiers
            somtGenerateSections: override;
        };
    #endif /* __SOMIDL__ */
    };
#endif /* myemit_idl */
``` myemit.c (the implementation of the new emitter class):
```
#define MyEmitter_Class_Source
```

-continued

```
    #include <myemit.ih>
    SOM_Scope Boolean    SOMLINK
somtGenerateSections (MyEmitter somSelf)
    {
            SOMTClassEntryC cls = _get_somtTargetClass (somSelf);
            _somtFileSymbols (somSelf);
            if (cls != (SOMTClassEntryC) NULL) {
                    _somtScanMethods(somSelf,
                                            "somtImplemented",
                                            "somtEmitMethodsProlog",
                                            "somtEmitMethod",
                                            "somtEmitMethodsEpilog",
                                            0);
                    _somtEmitClass(somSelf);
            }
            return (TRUE);
    }
    emitmyemit.c    (the driver program for the new
emitter):
-----------------------
    #include <scentry.h>
    #include <emitlib.h>
    #include <myemit.h>
    #define SYMBOLS_FILE    "myemit.efw"
    SOMEXTERN FILE *emit(char *file, Entry * cls, Stab *
stab)
{
            FILE *fp = somtopenEmitFile(file,    "myemit");
            FILE *deffile;
            SOMTClassEntryC oCls;
            MyEmitter emitter;
            SOMTTemplateOutputC t;
            if (cls->type == SOMTClassE) {
            oCls = (SOMTClassEntryC) somtGetObjectWrapper(cls);
                emitter = MyEmitterNew();
                _set_somtTargetFile(emitter, fp);
                _set_somtTargetClass(emitter, oCls);
                _set_somtEmitterName(emitter, "myemit");
                t = _get_somtTemplate(emitter);
                _set_somtCommentStyle(t, somtCPPE);
                if (deffile = _somtOpenSymbolsFile(emitter,
SYMBOLS_FILE, "r")) {
                        _somtReadSectionDefinitions(t, deffile);
                            fclose(deffile);
                    }
                    else {
                            fprintf(stderr, "Cannot open
Symbols file \" %s \".\n",
                                    SYMBOLS_FILE);
                                exit(-1);
                    }
                    _somtGenerateSections(emitter);
                    _somFree(emitter);
                    _somFree(oCls);
                    return (fp);
            }
            else return ((FILE *) NULL);
    }
-----------------------------
myemit.efw    (the template file for the new emitter):
-----------------------------
:methodsPrologS
            The following methods:
            :methodsS
                    <methodName>, of type <methodType>
:classS
                    are implemented by class <className>.
```

Automatically Generating Compiler Back-End Emitters

As can be appreciated by those skilled in the art, the emitter framework described above can generate a prodigious variety of output forms. One possible output form is a new emitter created by the emitter framework and discussed in this section. The particular emitter presented automatically generates a new generic emitter which can be easily customized by the developer.

Figure 12:
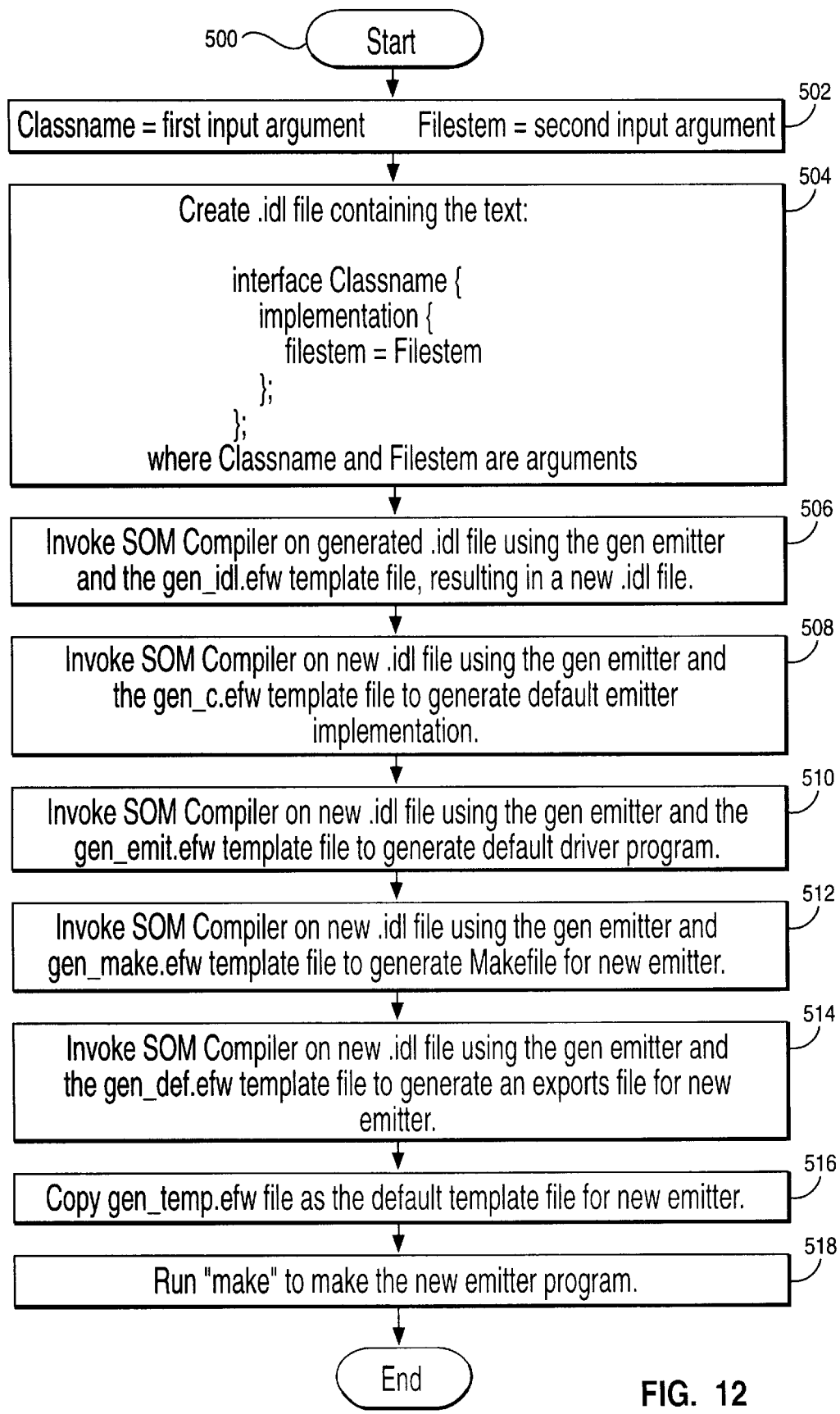
FIG. 12 is a flow diagram of a shell to generate a new emitter.
Figure 13:
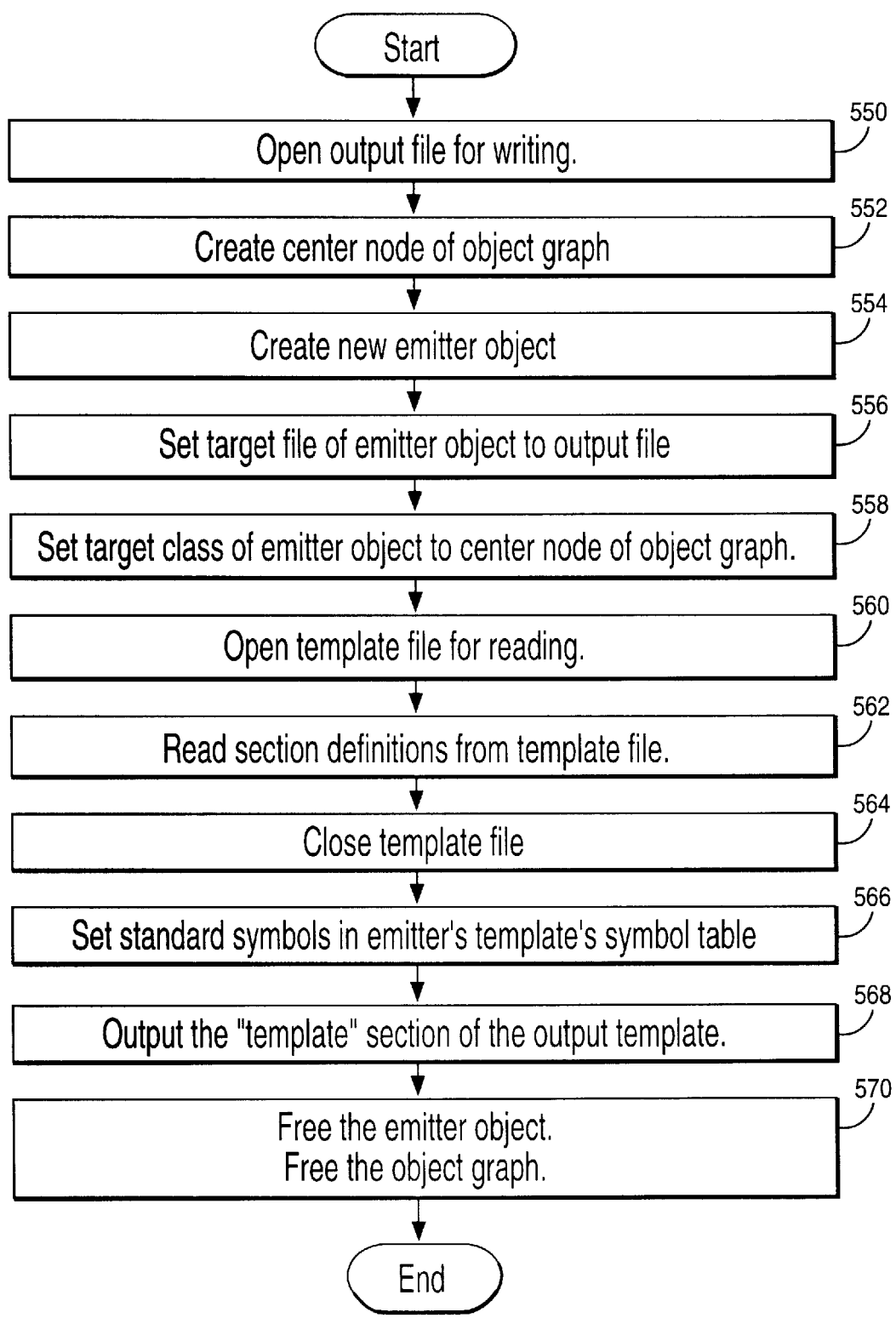
FIG. 13 is a flow diagram of the generic emitter.

The newemit facility consists of a shell script (a command file) and an emitter, "gen", written using the SOM Emitter Framework. The newemit script invokes the "gen" emitter several times to generate the various files needed by the new, generic emitter that it is creating. Each time the "gen" emitter is invoked by newemit, it uses a different output template, thus, yielding different output files. FIGS. 12 and 13, respectively, depict the newemit process, and the "gen" emitter that the newemit process invokes. Following the descriptions of the figures are the contents of the output template files that the "gen" emitter uses to produce its various output files.

The newemit facility takes two arguments: (1) the name of the new emitter class, and (2) the filestem for all the files to be generated.

Call these arguments Classname and Filestem, respectively. The newemit facility repeatedly invokes the generic emitter to create the various files needed by the new emitter it is generating: its IDL specification file the <stem>.idl file, its implementation file <stem>.c file, its driver program, the emit<stem>.c file, its template file, the <stem>.efw file, its export file, the <stem>.def file, and its Makefile. The gen emitter uses a different template file each time it is invoked, to produce different output files; it substitutes the emitter class name and filestem (the arguments to newemit) into the templates as it is producing output.

Referring to FIG. 12, after the facility call in step 500, the input arguments are stored in local variables in step 502. These will be used to construct the initial IDL file in the next step. In step 504, an initial IDL file is constructed for the new emitter class, to serve as a "primer" for the "gen" emitter, by outputting specific text to a <Filestem>.idl file.

The SOM Compiler is run in step 506 on the file created in step 504, requesting the "gen" emitter and using the gen_idl.efw output template file as input to the emitter. This produces a new more complete idl to replace the one created in step 504. In step 508, the SOM Compiler is run as in step 504, but using the gen_c.efw output template file as input to the "gen" emitter, resulting in different emitter output, namely the C implementation file for the new emitter class.

Again, in step 510, the SOM Compiler is run, but using the gen_emit.efw output template file as input to the "gen" emitter resulting in different emitter output, namely the C driver program for the new emitter. In step 514, the SOM Compiler is run using the gen_make.efw output template file as input to the "gen" emitter resulting in the Makefile for the new emitter. The Makefile is used to compile and link the new emitter. The SOM Compiler is run in step 516 using the gen_def.efw output template file as input to the "gen" emitter resulting in different emitter output, namely the exports file for the new emitter. The exports file is used in linking the new emitter.

In step 518, the gen_temp.efw file is copied as the default template file to be used as input by the new emitter program. Next, in step 520, the user of newemit runs "make" on the Makefile generated in step 514 to compile and link the new emitter program.

Referring now to FIG. 13, the "gen" emitter is an emitter written using the Emitter Framework. It makes the standard calls to the Emitter Framework to produce output from (1) the object graph (2) the standard symbols, and (3) its template file. The flow shown here is analogous to the flow shown in FIG. 5.

In step 550, the output file is opened for writing. The center node of the object graph is created from an entry object, of class SOMTClassEntryC in step 552. The center node of the object graph is like the root node of a tree and is created from a data structure passed to the emitter by the SOM Compiler. This step is performed by calling the somtGetObjectWrapper function provided by the emitter framework. In step 554, a new emitter object is created, an object of class SOMTEmitC, the default emitter class of the emitter framework using standard SOM procedures for creating objects by calling the SOMTEmitCNew procedure. In step 556, the target file of the emitter object, i.e., somtTargetFile attribute, is set to the file opened in step 550, so that the emitter will send its output to the appropriate file. In step 558, the target class of the emitter object, i.e., somtTargetClass attribute, is set to the entry object created in step 552. This is done so that the emitter can access information about the new emitter class, provided by the attributes of the entry object.

The template file is opened in step 560. The template file controls the output of the "gen" emitter and is varied by the user to allow the "gen" emitter to produce multiple output files.

Section definitions from the template file are read and stored in the emitter object's template object in step 562. The emitter object's template is an object of class SOMTTemplateOutputC, a class of the emitter framework. The template object is created automatically for the emitter object when the emitter object is created in step 554.

Step 562 is performed by using the somtReadSectionDefinitions method provided by the emitter framework's SOMTTemplateOutputC class, by invoking the method on the emitter object's template object. In step 564, the template file is closed.

Standard symbols are defined in the symbol table of the emitter object's template object in step 566. This symbol table is created automatically when the template object is created. The standard symbols are those that describe the new emitter class and will be used in the template definitions read in step 562. The standard symbol values given in step 566 will replace the occurrences of those symbols in the template definitions. Step 566 is performed by invoking the somtFileSymbols method provided by the emitter framework on the emitter object.

In step 568, the "template" section of the output template is emitted using the somtOutputSection method provided by the emitter framework's SOMTTemplateOutputC class. The emitter invokes somtOutputSection on its object's template object. The "gen" emitter assumes that its input template file(s) contain only a single section, named "template". Only a single section is used because this is a relatively simple emitter that needs to perform no sophisticated control flow. The contents of the output it produces is entirely controlled by its input template file.

In step 570, all allocated objects are freed by invoking the SOM-provided somFree method on those objects.

The contents of the template files that the "gen" emitter uses to produce its various output files are described in the following paragraphs:

gen__idl.efw:

The gen__idl.efw template file contains a single section, "template", containing the IDL specification of a new subclass of the SOMTEmitC Emitter Framework class. The name of the subclass is th e value of the <className> symbol. The IDL specification introduces no new methods or attributes;

it only includes the following class modifiers: callstyle=oidl;

somtGenerateSections: override;

filestem=<classSourceFileStem> gen__c.efw:

The gen__c.efw template file contains a single section, "template", containing th e default implementation for a new subclass of SOMTEmitC. The subclass is assumed to have name <className> and filestem <classSourceFileStem>. These symbols are used in the template.

The implementation contains a single method function (for the somtGenerateSections method). The code within this method simply invokes the somtFileSymbols method (for initialization of standard symbols) and then invokes all of the section-emitting methods provided by SOMTEmitC (e.g., somtEmitProlog, somtEmitEpilog, and so on). Some sections only apply when the emitter has target class, while others apply only when the emitter has a target module; the implementation of somtGenerateSections insures that only the appropriate section-emitting methods are invoked in either case. For repeating sections, the implementation of somtGenerateSections invokes the appropriate scanning method. For example, to emit the BaseS repeating section, the new implementation of somtGenerateSections invokes the somtScanBases method.

gen__emit.efw:

The gen__emit.efw template file contains a single section, "template", containing the code for a driver program for a new sublclass of SOMTEmitC whose name is the value of the <className> symbol. The control flow of this driver program is shown in FIG. 5.

The driver program must test whether is has been passed a module or a class Entry, because it must create a different type of Entry object in each case. The basic steps performed by the driver program contained in this template file are to open an output file, create an Entry object corresponding to the input Entry object, instantiate and initialize a new emitter object, open the template file and read the section definitions it contains into the emitter's template object, and invoke the somtGenerateSections method on the emitter object.

gen__def.efw:

The gen__def.efw template file contains a single section, "template", containing the following text:

LIBRARY emit<classSourceFileStem> TERMINSTANCE

PROTMODE

DATA MULTIPLE NONSHARED LOADONCALL

EXPORTS emit gen__make.efw:

The gen__make.efw template file contains a single section, "template", containing the contents of a Makefile for a new emitter program.

The Makefile contains instructions for creating the emit<classSourceFileStem>.o and <classSourceFileStem>.o object modules and the emit<classSourceFileStem>.dll class library from the following source files: emit<classSourceFileStem>.c, <classSourceFileStem>.c, <classSourceFileStem>.efw, and <classSourceFileStem>.idl.

The emit<classSourceFileStem>.o is dependent on the emit<classSourceFileStem>.c and <classSourceFileStem>.ih files, the <classSourceFileStem>.ih header file is dependent on the <classSourceFileStem>.idl file, and the <classSourceFileStem>.o file is dependent on the <classSourceFileStem>.c and <classSourceFileStem>.ih files.

gen__temp.efw:

The gen__temp.efw file is a default template file for a new emitter. This file contains all the standard sections, and each section contains each of the standard symbols defined (by the emitter framework) for that section. This file is to be later customized by the creator of the new emitter. It simply serves as an inventory of the standard sections and symbols that the emitter writer can use in his own customized template.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A system for specifying a format of an output file from a compiler comprising:

a compiler which accepts first and second input files to the compiler, where the first input file is a source file which is compiled to produce the output file and the second input file is a file for specifying a format for at least a first section of the output file; and a facility within the compiler for formatting output from the compiler according to the second input file to produce the first output file section in the desired format, whereby the specified format in the second input file overrides a format which would ordinarily result from compilation of the first input file.

2. The system as recited in claim 1, wherein the compiler comprises a precompiler section which compiles the first input file to an intermediate form and an emitter section which converts the intermediate form to the final output file, wherein the emitter section accepts the second input file.

3. The system as recited in claim 1 wherein the second input file specifies formats for each of a plurality of sections of the output file.

4. The system as recited in claim 1 wherein the compiler and the facility are implemented as objects in an object oriented programming language.

5. A method for specifying a format of an output file from a compiler comprising the steps of:

compiling a first input file by the compiler;

accepting a second input file to the compiler which specifies a format for at least a first section of the output file; and formatting output from the compiler according to the second input file to produce the output file section in the desired format, whereby the specified format in the second input file overrides a format which would ordinarily result from compilation of the first input file.

6. The method as recited in claim 5, further comprising the steps of:

compiling the first input file in a precompiler section of the compiler to an intermediate form; and converting the intermediate form in an emitter section of the compiler to the final output file, wherein the emitter section performs the accepting and formatting steps.

7. The method as recited in claim 5 wherein the second input file specifies formats for each of a plurality of sections of the output file.

8. The method as recited in claim 5 wherein the compiler and the facility are implemented as objects in an object oriented programming language.

9. A computer program product in a computer readable medium for specifying a format of an output file from a compiler comprising:

a compiler for compiling a first input file;

in the compiler, means for accepting a second input file specifying a format for at least a section of the output file; and in the compiler, a facility for formatting output from the compiler according to the second file to produce the output file section in the specified format, whereby the specified format in the second input file overrides a format which would ordinarily result from compilation of the input file.

10. The product as recited in claim 9 further comprising:

a precompiler section of the compiler for compiling the first input file to an intermediate form; and an emitter section of the compiler for converting the intermediate form to the final output file, wherein the formatting facility which accepts the second input file is part of the emitter section.

11. The product as recited in claim 9 wherein the second input file specifies formats for each of a plurality of sections of the output file.

12. The product as recited in claim 9 wherein the compiler and the facility are implemented as objects in an object oriented programming language.

* * * * *